US011831646B2

(12) United States Patent
Achyuth et al.

(10) Patent No.: US 11,831,646 B2
(45) Date of Patent: Nov. 28, 2023

(54) AUTHENTICATION FOR SECURE FILE SHARING

(71) Applicant: Citrix Systems, Inc., Fort Lauderdale, FL (US)

(72) Inventors: Nandikotkur Achyuth, Bangalore (IN); Satish Vanahalli, Bangalore (IN); Chirag Agarwal, Los Angles, CA (US); Arnav Akhoury, Bangalore (IN)

(*) Notice: Subject to any disclaimer, the term of this patent is extended or adjusted under 35 U.S.C. 154(b) by 688 days.

(21) Appl. No.: 16/371,406

(22) Filed: Apr. 1, 2019

(65) Prior Publication Data

US 2020/0314104 A1 Oct. 1, 2020

(51) Int. Cl.
*H04L 9/40* (2022.01)
*H04L 9/08* (2006.01)
*H04W 12/06* (2021.01)
*H04W 12/08* (2021.01)

(52) U.S. Cl.
CPC .......... *H04L 63/102* (2013.01); *H04L 9/0819* (2013.01); *H04L 63/0861* (2013.01); *H04L 63/0884* (2013.01); *H04W 12/06* (2013.01); *H04W 12/08* (2013.01)

(58) Field of Classification Search
CPC ............... H04L 63/102; H04L 63/0861; H04L 63/0884; H04L 9/0819
USPC .......................................................... 726/7
See application file for complete search history.

(56) References Cited

U.S. PATENT DOCUMENTS 7,942,738 B2* 5/2011 Alderucci ........... G07F 17/3232
463/29

| 2008/0086764 | A1* | 4/2008 | Kulkarni | H04L 9/3234 |
| | | | | 726/7 |
| 2010/0153717 | A1* | 6/2010 | Sandler | H04L 9/0819 |
| | | | | 713/168 |
| 2013/0082819 | A1* | 4/2013 | Cotterill | G06Q 10/10 |
| | | | | 340/5.51 |
| 2014/0041005 | A1* | 2/2014 | He | H04L 63/08 |
| | | | | 726/7 |

(Continued)

FOREIGN PATENT DOCUMENTS

WO 2016033208 A1 3/2016

OTHER PUBLICATIONS

Extended European Search Report dated Aug. 20, 2020 for European Patent Application No. 20160378.4, pp. 1-8.

*Primary Examiner* — Dant B Shaifer Harriman

(57) ABSTRACT

This disclosure is directed to embodiments of systems and methods for controlling the access to files or other data. In some of the disclosed embodiments, a computing system receives a request for access to data by a first device operated by a first user, and determines that an identity of a second user associated with the data is to be authenticated to allow access to the data by the first device. The computing system invokes an authentication process to authenticate the identity of the second user based on an input provided to a second device by the second user and, based on that authentication process, determines that the identity of the second user has been authenticated based on the first input. The computing system then provides access to the data by the first device based at least in part on authentication of the identity of the second user. The authentication process may, for example, authenticate the identity of the second user based on a biometric input provided by the second user.

30 Claims, 13 Drawing Sheets

(56) References Cited

U.S. PATENT DOCUMENTS

| | | |
|---|---|---|
| 2016/0117448 A1 | 4/2016 | Van De Craen et al. |
| 2017/0310685 A1* | 10/2017 | Zhao ................ H04W 12/0608 |
| 2018/0026970 A1* | 1/2018 | Votaw ................ H04L 63/0853 |
| | | 726/7 |
| 2018/0027413 A1* | 1/2018 | Hanley .................... G07C 9/37 |
| | | 726/7 |
| 2018/0336336 A1 | 11/2018 | Elovici et al. |
| 2019/0251562 A1* | 8/2019 | Dabiri .................... G06Q 50/01 |

* cited by examiner

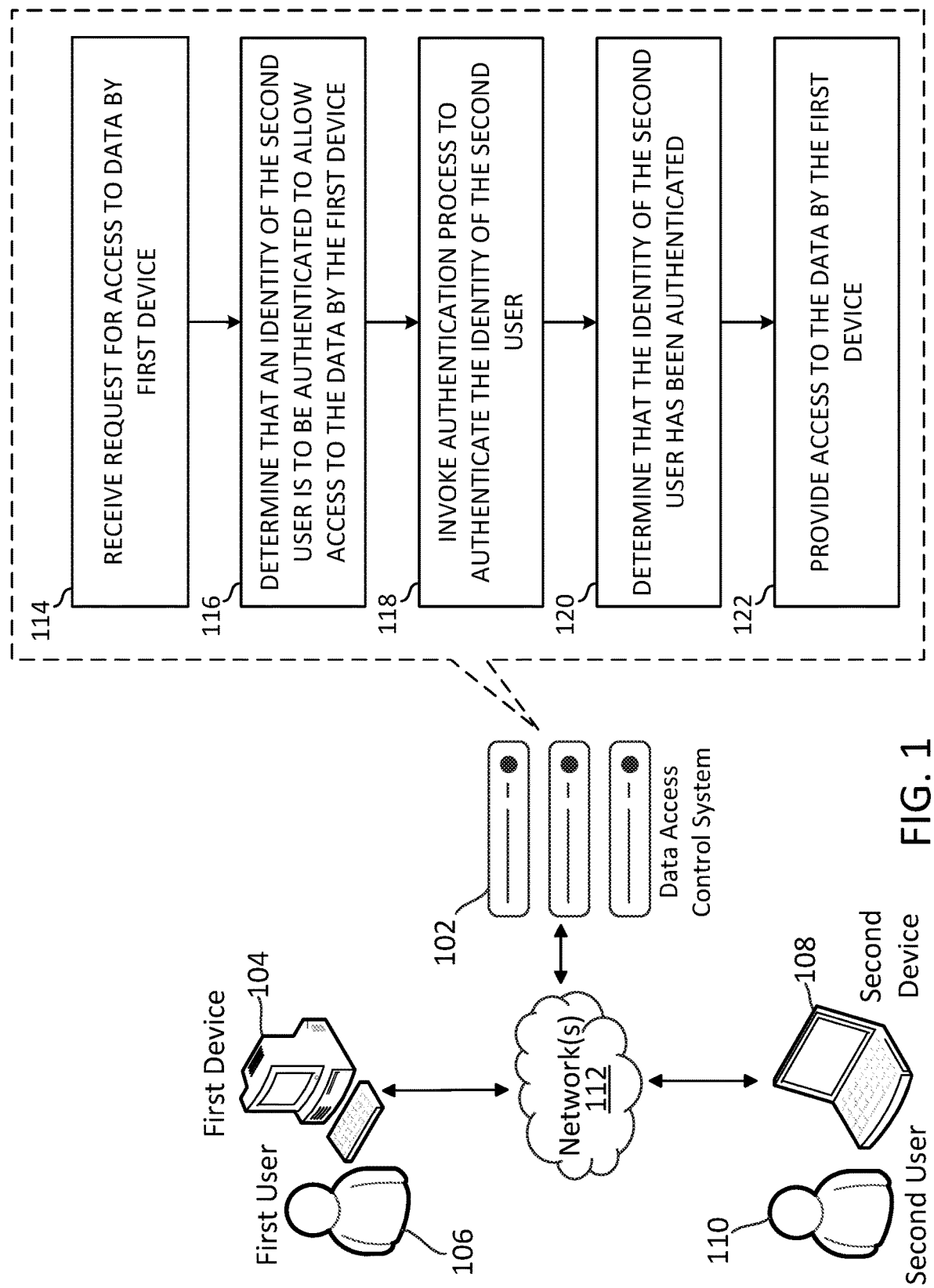

AUTHENTICATION FOR SECURE FILE SHARING

BACKGROUND

Various file sharing systems have been developed that allow users to share files or other data. ShareFile®, offered by Citrix Systems, Inc., of Fort Lauderdale, FL, is one example of such a file sharing system.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed to embodiments of systems and methods for controlling the access to files or other data. In accordance with some of the disclosed embodiments, a computing system receives a request for access to data by a first device operated by a first user, and determines that an identity of a second user associated with the data is to be authenticated to allow access to the data by the first device. The computing system invokes a first authentication process to authenticate the identity of the second user based on an input provided to a second device by the second user and, based on the first authentication process, determines that the identity of the second user has been authenticated based on the first input. The computing system then provides access to the data by the first device based at least in part on authentication of the identity of the second user.

In some embodiments, the computing system may additionally determine that an identity of the first user associated with the data is to be authenticated to allow access to the data by the first device, and may invoke a second authentication process for authenticating the identity of the first user based on a second input provided to the first device by the first user. In such embodiments, the computing system may determine that the identity of the first user has been authenticated based on the second input, and may provide access to the data by the first device based at least in part on authentication of the identity of the first user.

In some embodiments, the first and/or second authentication processes may authenticate the identity of the first and/or second users based on biometric inputs provided by the first and/or second users.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1 is a diagram illustrating certain features of an embodiment of a data access control system configured in accordance with the present disclosure;

DETAILED DESCRIPTION

Figure 2A:
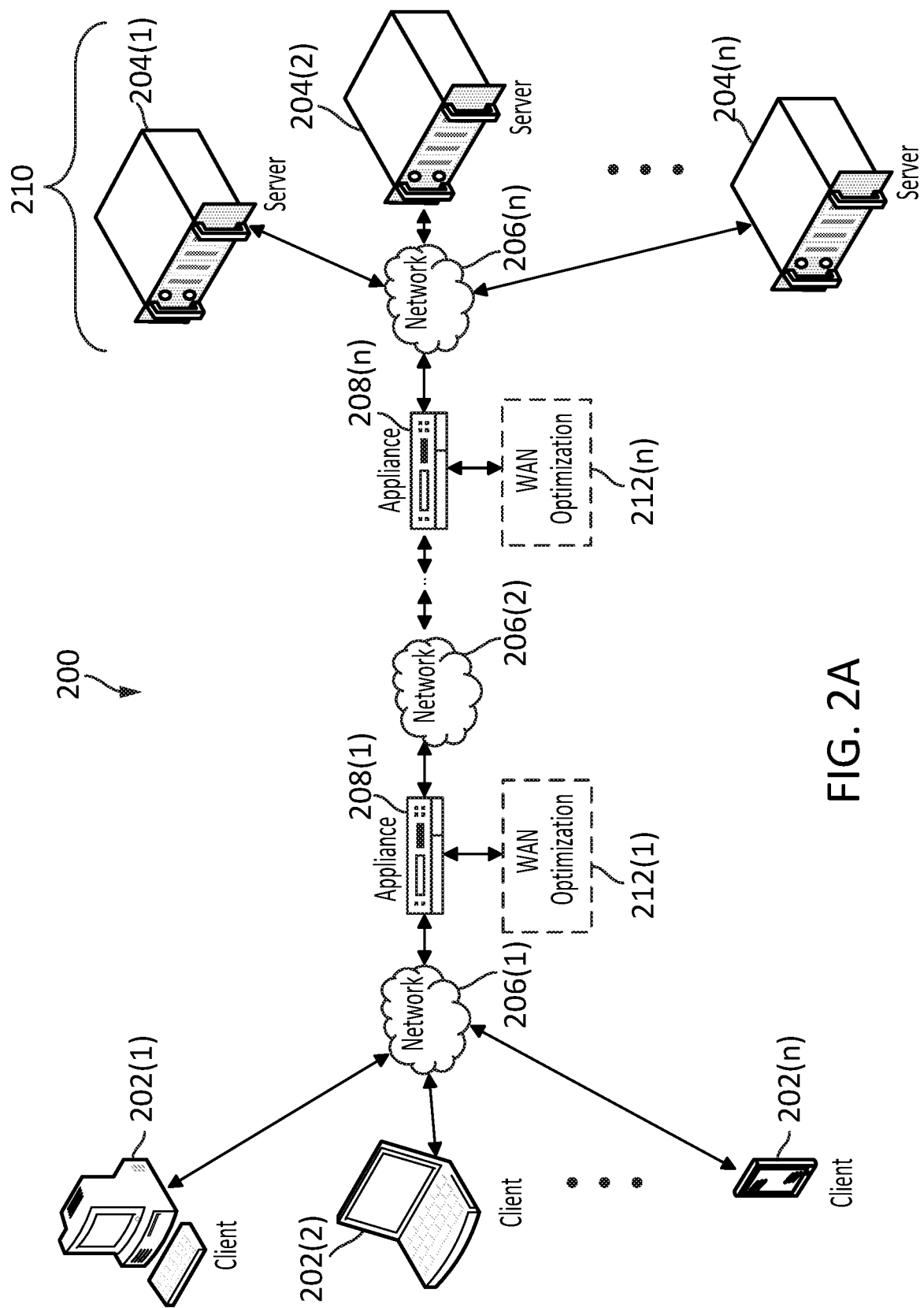
FIG. 2A is a diagram of a network computing environment in which some embodiments of the data access control system disclosed herein may be deployed.

Some file sharing systems allow a client device to upload or download files to or from a repository once an authorized user of the client device (e.g., a user who has an active account with the file sharing system) has authenticated his or her identity by accurately entering a user name and password. Such file sharing systems may also allow an authenticated, authorized user to enable a client device operated by an unauthorized individual (e.g., someone who does not have an active account with the file sharing system) to upload or download one or more files to or from the repository by causing the system to generate and send to such a device a unique token that enables limited access to the repository. Some file sharing systems additionally allow a person sending a file to an unauthorized user to create a password which must subsequently be entered by the unauthorized user before the system will transfer the file to the unauthorized user's device. It is also known to encrypt files using passwords and to require entry of the correct password every time a file is accessed, no matter where the file is located.

Certain file sharing systems can potentially be compromised if the authentication credentials (e.g., user name and password) of an authorized user are stolen or misused, or if a password that is shared with an unauthorized user (e.g., to enable file transfer or access) is stolen or misused. In addition, files that are successfully transferred and/or accessed using existing file sharing systems are generally assumed to have originated from a legitimate source, such that it is not readily apparent whether a particular file contains hoax information. Further, certain systems may not provide for further control or other gatekeeping related to the file by its author or sender once a recipient of the file has provided their credentials to access the file.

Offered is a system in which the identity of a person other than the user attempting to access a file (or other data) is authenticated before access to the file (or other data) is permitted. Although the following description generally refers to a "file" that can be accessed, it should be appreciated that this disclosure is not limited to the accessing of files, as the disclosed systems and techniques can likewise be used to control access to data that is not in the form of a file. For example, as described in more detail below, in some embodiments, the authentication techniques disclosed herein may also be used to regulate access to a computing environment delivered to a user's computer by a server-based application delivery system, to regulate access to one or more applications or other resources delivered to such a computing environment, and/or to regulate access to one or more applications or other resources on a user's computing device. The general use of term "file" in this disclosure should thus not be considered limiting.

By requiring another person (e.g., the author of a file or person responsible for uploading the file to a file sharing system, the first user's supervisor, one or more members of a delegate group, etc.) to authenticate his or her identity at least the first time, and perhaps every time, access to a file (or other data) is attempted, an additional layer of security can be provided to confirm the user attempting access should indeed be allowed to access the file (or other data). Using this technique, the user to whom access is so provided can also have additional confidence that the file (or other data) in question came from a legitimate source.

For purposes of reading the description of the various embodiments below, the following descriptions of the sections of the specification and their respective contents may be helpful:

Section A provides an introduction to an example embodiment of a data access control system configured in accordance with the present disclosure;

Section B describes a network environment and computing environment which may be useful for practicing embodiments described herein;

Section C describes example embodiments of appliances that may deployed in a networking environment such as that describe in Section B;

Section D describes embodiments of systems and methods for virtualizing an application delivery controller;

Section E describes embodiments of systems and methods for enabling file sharing over one or more networks;

Section F describes embodiments of systems and methods for implementing servers in a cloud-based environment;

Section G provides a detailed description of example embodiments of a data access control system configured in accordance with the present disclosure; and Section H describes example implementations of methods, systems, and computer-readable media in accordance with the present disclosure.

A. Introduction to an Illustrative Embodiment of a Data Access Control System

FIG. 1 shows an example embodiment of a computer network environment including a data access control system 102 that may be used to implement various aspects of the present disclosure. Although FIG. 1 illustrates the system 102 as including just three servers, it should be appreciated that the system 102 may include any number of servers as well as any number of additional or different components, such as one or more databases, other network components, etc. As shown in FIG. 1, the system 102 may communicate with other computing devices via one or more networks 112, including a first device 104 operated by a first user 106 and a second device 108 operated by a second user 110. Although the first device 104 and the second device 108 are shown is FIG. 1 as stand-alone computers, it should be appreciated that one or both of the first device 104 and the second device 108 shown in FIG. 1 may instead represent other types of computing devices or systems that can be operated by users 106, 110. In some embodiments, for example, one or both of the first device 104 and the second device 108 may be implemented as a server-based virtual computing environment that can be remotely accessed using a separate computing device operated by the users 106, 110.

As FIG. 1 illustrates, in some embodiments, the system 102 may receive (step 114) a request for access to data (e.g., a file) by the first device 104 operated by the first user 106. In some embodiments, for example, the access request may be generated by the first device 104 when the first user 106 selects a link or other user interface element identifying a file the first user 106 desires to have transferred to the first device 104. Such a link or element may, for example, have been included in an email, text message, or other communication received by the first device 104. In still other embodiments, the second user 110 operating the second device 108 may cause a file to be uploaded to the system 102, and the second device 108 or the system 102 may then send a communication to the first device 104 containing a link or other user interface element identifying the file that has been uploaded. Selection of that link or other element may, for example, cause an access request to be sent to the system 102.

Additionally or alternatively, in some embodiments, the first user 106 may access a web page identifying one or more files that are available for download and/or are available for on-line access using a web browser, and an access request may be generated in response to the user selecting one of the identified files. In some embodiments, for example, the first user 106 may be an authorized user of the system 102 and may gain access to a list of files available for download or on-line viewing after successfully authenticating his or her identity to the system 102 (e.g., by entering a user name or password, via biometric authentication, etc.). The access request of the step 114 may be generated, for example, in response to the first user 106 selecting one of the items on such a list.

In other embodiments, the access request of the step 114 may be generated in response to the first user 106 causing the first device 104 to request that a computing environment be delivered to the first device 104 by an application delivery controller (described in more detail below) that is included in or provided in association with the system 102, or in response to the first user 106 causing the first device 104 to request that the first device 104 be allowed to access one or more applications or other resources within such a computing environment.

In yet other embodiments, the access request of the step 114 may additionally or alternatively be generated and sent to the system 102 in response to the first user 106 attempting to access a file, application, or other resource already present on the first device 104. For example, a file, application, etc., on the first device 104 may be encrypted or otherwise configured to be inaccessible without proper authorization. In some embodiments, for example, each time a file, application, etc., is uploaded or otherwise provided to the system 102, or an associated file sharing or application delivery system, the file, application, etc., may be encrypted using unique public and private keys, and such an encrypted file, application, etc., may subsequently be transferred to the first device 104. In other embodiments, the author of the file, application, etc. (e.g., the second user 110) may have saved the file (or other data) with one or more security settings and emailed or otherwise communicated the file, application, etc., to the first device 104. In any such embodiment, the first device 104 may cause the access request to be generated and sent to the system 102 when the first user 106 attempts to open or access the file, application, etc.

In some embodiments, the access request of the step 114 may be generated by an application on the first device 104 that is used to attempt to open or access the file or other data. Such an application may, for example, be a mobile or desktop application installed on the first device 104 (or in a computing environment accessible by the first device 104) before an encrypted file or other data is received by the first device. The ShareFile® mobile app and the ShareFile® desktop app offered by Citrix Systems, Inc., of Fort Lauderdale, FL, are examples of such preinstalled applications. In other embodiments, an encrypted file or other data and an application for accessing the file or other data may be combined into an executable container, and such a container may be sent, e.g., from a file sharing system or other device or system, to the first device 104. When such a container is subsequently executed by the first device 104, the embedded application may generate and send the access request of the step 114 to the system 102. Examples of techniques that may be used to containerize files or other data with applications in this manner are described, for example, in U.S. Pat. No. 10,868,855, entitled "FILE CONTAINERIZATION AND MANAGEMENT," the entire contents of which are hereby incorporated by reference.

As further shown in FIG. 1, upon receiving an access request, the system 102 may determine (step 116) that an identity of one or more additional individuals (e.g., the second user 110) needs to be authenticated to allow access to the file (or other data) by the first device 104. In some embodiments, for example, the system 102 may evaluate one or more records associated with the file (or other data) identified in the received access request to determine whether those records indicate authentication by any additional individuals is required. If it is determined by the system 102 that authentication by an additional user is not required, then access to the file (or other data) may be provided without requiring any action by another user. If, on the other hand, examination of the records indicate that authentication by one or more additional individuals (e.g., the second user 110 or one or more members of a delegate group) is required, then an authentication process may be invoked (step 118) to authenticate the identity of such individual(s) prior to allowing access to the file or other data by the first device 104.

The process used for additional user authentication can take any of numerous forms. In some embodiments, for example, the system 102 may send a message to the second device 108 prompting the second user 110 to provide one or more inputs (e.g., a biometric input, a password, etc.) to the second device 108 (or to another device operated by the second user 110, e.g., a smartphone), and the second device 108 (or the other device) may communicate such inputs to the system 102 for comparison with stored authentication information (e.g., fingerprint data, a password, answers to security questions, etc.). The identity of the second user 110 may be authenticated, for example, when the authentication information the system 102 receives matches the stored authentication information associated with the second user 110.

In other embodiments, the identity of the second user 110 may be authenticated by sending a confirmation request to a device or service known to be accessible by the second user 110 only upon proper authentication of the second user's identity. For example, in some implementations, a request for confirmation that the first user 106 should be permitted to access a particular file (or other data) may be sent to a proprietary mobile device or email account associated with the second user 110. In such implementations, receipt of an affirmative confirmation from the associated device or service may be relied upon, at least in part, to authenticate the identity of the second user 110.

In other embodiments, the system 102 may additionally or alternatively rely on a trusted authentication service to authenticate the identity of the second user 110 (and possibly one or more additional members of a delegate group). In some implementations, for instance, the system 102 may send an authentication request identifying the second user 110 to an authentication service (not shown in FIG. 1) and the authentication service may prompt the second user 110 to provide an authentication input, e.g., by applying a fingerprint to a fingerprint scanner associated with the second device 108, or otherwise take steps to authenticate the second user's identity. The authentication service may then send a message back to the system 102 indicating whether or not the identity of the second user 110 has been successfully authenticated. In some implementations, the authentication service may operate in conjunction with a mobile device operated by the second user 110 to perform biometric or another form of authentication. In some such embodiments, authentication (e.g., using a fingerprint) can be performed for the second user 110 without the second user's biometric or other authentication information leaving a device under the second user's control.

As shown in FIG. 1, as a result of the authentication process that was invoked at the step 118, the system 102 may determine (step 120) that the identity of the second user 110 (and possibly one or more additional individuals in a delegate group) has been authenticated and, based at least in part on that determination, may provide (step 122) access to the file or other data by the first device 104. Access to the file or other data by the first device 104 may be provided in any of numerous ways. In some embodiments, for example, the first device 104 may be provided access to a file or other data by causing or allowing the file or other data to be transferred from the system 102, or from an associated file sharing system or other repository, to the first device 104. In other embodiments, the first device 104 may be provided access to a file, application, etc., by allowing the first device 104 to access the file, application, etc., on line using a web browser or the like. In yet other embodiments, access to a file or other data may additionally or alternatively be provided by supplying the first device 104 with a unique access token or other mechanism that can subsequently be used to retrieve the file or other data from the system 102, or from an associated file sharing system or other repository.

In other embodiments, the first device 104 may be provided access to data by allowing a server-based application delivery system (described below) to deliver a computing environment to the first device 104, or by allowing such an application delivery system to deliver one or more applications or other resources to such a computing environment.

In yet other embodiments, the first device 104 may additionally or alternatively be provided access to a file (or other data) by providing the first device 104 with a decryption key that may be used to decrypt the file (or other data). For example, in some embodiments, each time a file, application, etc., is uploaded or otherwise provided to the data access control system 102, or to an associated file sharing or application delivery system, the file, application, etc., may be encrypted using unique public and private keys. In other embodiments, as noted above, a file, application, or other data may be encrypted based on security settings set by the author of the same. In any such embodiments, access to the file, application, etc., by the first device 104 may be provided, at least in part, by sending a decryption key to the first device 104. In such embodiments, an application on the first device 104, either independent of the file or other data or packaged in an executable container along with the file or other data as discussed above, may use the decryption key received from the system 102 to decrypt the file or other data.

As explained in more detail below, in some embodiments, the system 102 may, upon receiving an access request from the first device 104, additionally invoke another authentication process (using biometric authentication or otherwise) to authenticate the identity of the first user 106 of the first device 104 prior to providing access to the file or other data by the first device 104. In such embodiments, the system 102 may ensure not only that a particular individual (the second user 110) is granting access privileges but also that the first user 106 is the intended recipient of such privileges.

Additional details and example implementations of embodiments of the present disclosure are set forth below in Section H, following a description of example systems and network environments in which such embodiments may be deployed.

B. Network and Computing Environment

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, the first device 104 and the second device 108 shown in FIG. 1 may, for example, correspond to respective ones of the clients 202 shown in FIG. 2A.

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a wide area network (WAN) or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more of the appliances 208 may be implemented as network devices sold by Citrix Systems, Inc., of Fort Lauderdale, FL, such as Citrix Gateway™ or Citrix ADC™.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, as explained in more detail below, one or more server farms 210 may execute one or more applications on behalf of one or more of clients 202 (e.g., as an application server system) and/or may facilitate the sharing of files between the clients 202 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another. For example, in some embodiments, one server farm 210 may operate as a data access control system 102 (as disclosed herein) and another server farm 210 may operate as an application server system (described in more detail below), with one or more servers 204 of the application serving system providing a virtual computing environment to a client 202 and also accessing a file from the system 102 on behalf of the client 202.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, FL, such as Citrix SD-WAN™ or Citrix Cloud™.

Figure 2B:
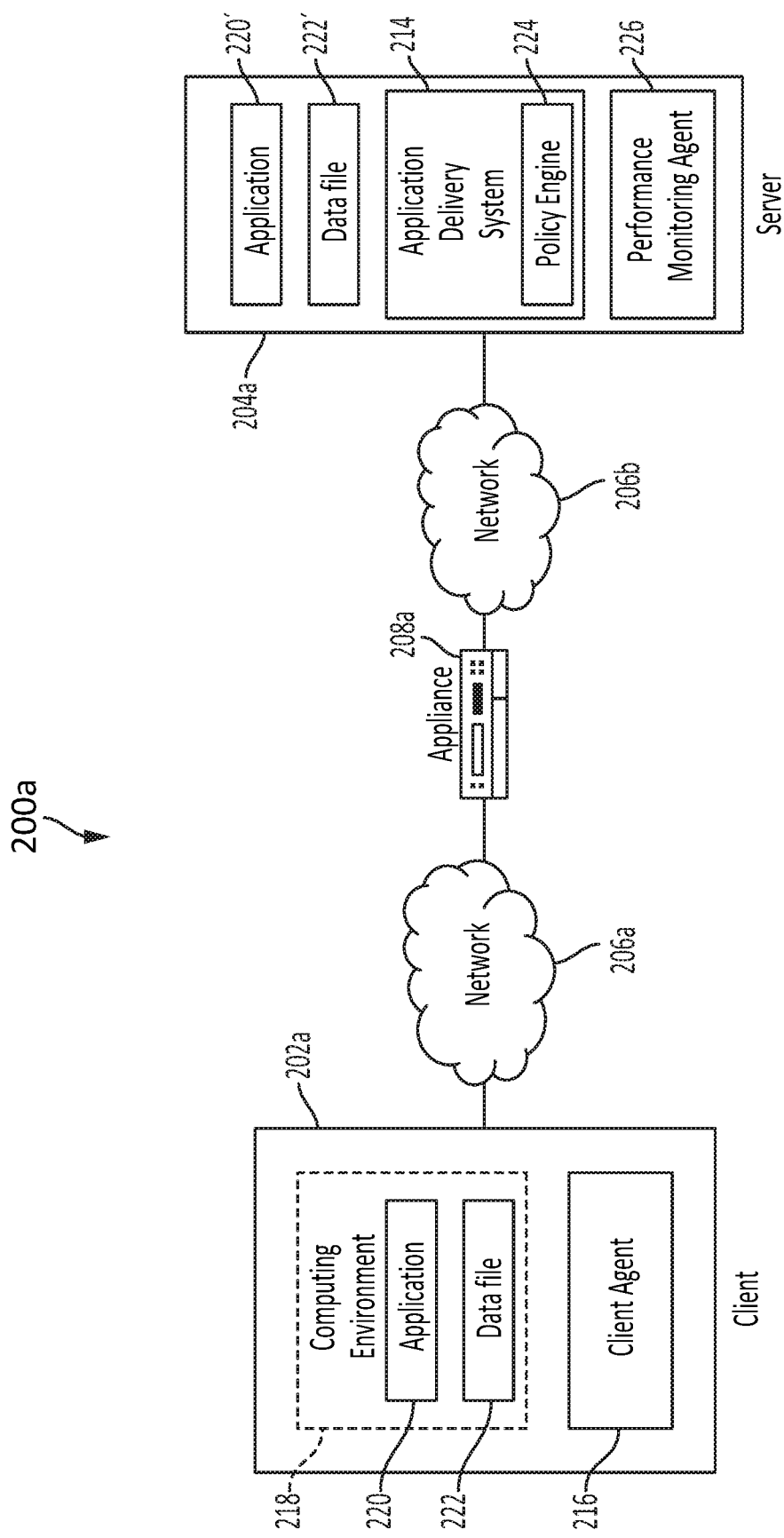
FIG. 2B is a diagram illustrating how a network computing environment like that shown in FIG. 2A may be configured to deliver a computing environment from a server to a client.

Referring to FIG. 2B, an example network environment 200a for delivering and/or operating a computing environment on a client 202a is shown. As shown in FIG. 2B, in some embodiments, a client 202a may include a computing environment 218, and a server 204a may include an application delivery system 214 for delivering a computing environment, application, and/or data files to one or more clients 202.

In some embodiments, each client 202 may additionally include a client agent 216 for establishing and exchanging communications with the appliance 208 and/or the server(s) 204 via a network 206. The client 202a may, for example, have installed and/or execute one or more applications that are in communication with the network 206a. In some embodiments, the client agent 216 may intercept network communications from a network stack used by the one or more applications. For example, the client agent 216 may intercept a network communication at any point in a network stack and redirect the network communication to a destination desired, managed, and/or controlled by the client agent 216, for example, to intercept and redirect a transport layer connection to an IP address and port controlled and/or managed by the client agent 216. The client agent 216 may thus, in some embodiments, transparently intercept any protocol layer below the transport layer, such as the network layer, and any protocol layer above the transport layer, such as the session, presentation, or application layers. The client agent 216 may, for example, interface with the transport layer to secure, optimize, accelerate, route, and/or load-balance any communications provided via any protocol carried by the transport layer.

In some embodiments, the client agent 216 may be implemented as an Independent Computing Architecture (ICA) client developed by Citrix Systems, Inc. The client agent 216 may perform acceleration, streaming, monitoring, and/or other operations. For example, the client agent 216 may accelerate streaming an application from the server 204a to the client 202a. The client agent 216 may also perform end-point detection/scanning and/or collect end-point information about the client 202a for the appliance 208a and/or the server 204a. The appliance 208a and/or the server 204a may use the collected information to determine and provide access, authentication, and/or authorization control of the client's connection to the network 206a. For example, the client agent 216 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The computing environment 218 may, for example, execute or operate an application 220 that accesses, processes and/or uses a data file 222. The computing environment 218, application 220 and/or data file 222 may be delivered via an appliance 208a and/or the server 204a.

The appliance 208a may accelerate delivery of all or a portion of the computing environment 218 to the client 202a, for example by the application delivery system 214. For example, the appliance 208a may accelerate delivery of a streaming application 220' and data 222' file processable by the application 220' from a data center to a remote user location by accelerating transport layer traffic between the client 202a and the server 204a. Such acceleration may be provided by one or more techniques, such as: 1) transport layer connection pooling, 2) transport layer connection multiplexing, 3) transport control protocol buffering, 4) compression, 5) caching, or other techniques. The appliance 208a may also provide load balancing of servers 204 in a server farm 210 (shown in FIG. 2A) to process requests from the clients 202, act as a proxy or access server to provide access to the one or more servers 204, provide security and/or act as a firewall between the clients 202 and the servers 204, provide Domain Name Service (DNS) resolution, provide one or more virtual servers or virtual internet protocol servers, and/or provide secure virtual private network (VPN) connections from the clients 202 to the servers 204, such as a secure socket layer (SSL) VPN connection and/or provide encryption and decryption operations.

The application delivery system 214 may deliver the computing environment 218 to a user (e.g., client 202a), remote or otherwise, based on authentication and authorization policies applied by a policy engine 224. A remote user may obtain a computing environment and access to server stored applications 220' and data files 222' from any network-connected device (e.g., the client 202a). For example, the appliance 208a may request an application 220' and data file 222' from the server 204a. In response to the request, the application delivery system 214 and/or the server 204a may deliver the application 220' and data file 222' to the client 202a, for example via an application stream to operate in the computing environment 218 on client the 202a, or via a remote-display protocol or otherwise via remote-based or server-based computing. In an embodiment, application delivery system 214 may be implemented as any portion of the Citrix Workspace™ by Citrix Systems, Inc., of Fort Lauderdale, FL such as Citrix Virtual Apps and Desktops™.

The policy engine 224 may control and manage the access to, and execution and delivery of, applications. For example, the policy engine 224 may determine the one or more applications a user or client 202 may access and/or how the application should be delivered to the user or client 202, such as a server-based computing, streaming or delivering the application locally to the client 202 for local execution.

For example, in operation, the client 202a may request execution of an application (e.g., application 220') and the application delivery system 214 of the server 204a may determine how to execute the application 220', for example based upon credentials received from the client 202a and a user policy applied by the policy engine 224 associated with the credentials. For example, the application delivery system 214 may enable the client 202a to receive application-output data generated by execution of the application on the server 204a, may enable client the 202a to execute the application 220 locally after receiving the application from the server 204a, or may stream the application via one or more networks 206a, 206b to the client 202a. For example, in some embodiments, the application 220 may be a server-based or a remote-based application executed on the server 204a on behalf of the client 202a. The server 204a may display output to the client 202a using a thin-client or remote-display protocol, such as the Independent Computing Architecture (ICA) protocol by Citrix Systems, Inc. The application 220 may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

As shown, one or more servers 204 may also include a performance monitoring service or agent 226. In some embodiments, a dedicated one or more servers 204 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., the client agent 216), one or more servers 204 (e.g., the agent 226) and/or one or more appliances 208 and/or 212 (agent not shown). In general, the monitoring agents (e.g., agent 216 and/or agent 226) may execute transparently (e.g., in the background) to any application and/or user of the device. In some embodiments, the monitoring agent 226 may be implemented as Citrix Analytics™ by Citrix Systems, Inc., of Fort Lauderdale, FL.

The monitoring agents may, for example, monitor, measure, collect, and/or analyze data on a predetermined frequency, based upon an occurrence of given event(s), or in real time during operation of the network environment 200a. The monitoring agents may monitor resource consumption and/or performance of hardware, software, and/or communications resources of the clients 202, networks 206, appliances 208 and/or 212, and/or servers 204. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the application delivery system 214. For example, based upon one or more monitored performance conditions or metrics, the application delivery system 214 may be dynamically adjusted, for example periodically or in real-time, to optimize application delivery by the servers 204 to the clients 202 based upon network environment performance and conditions.

Figure 2C:
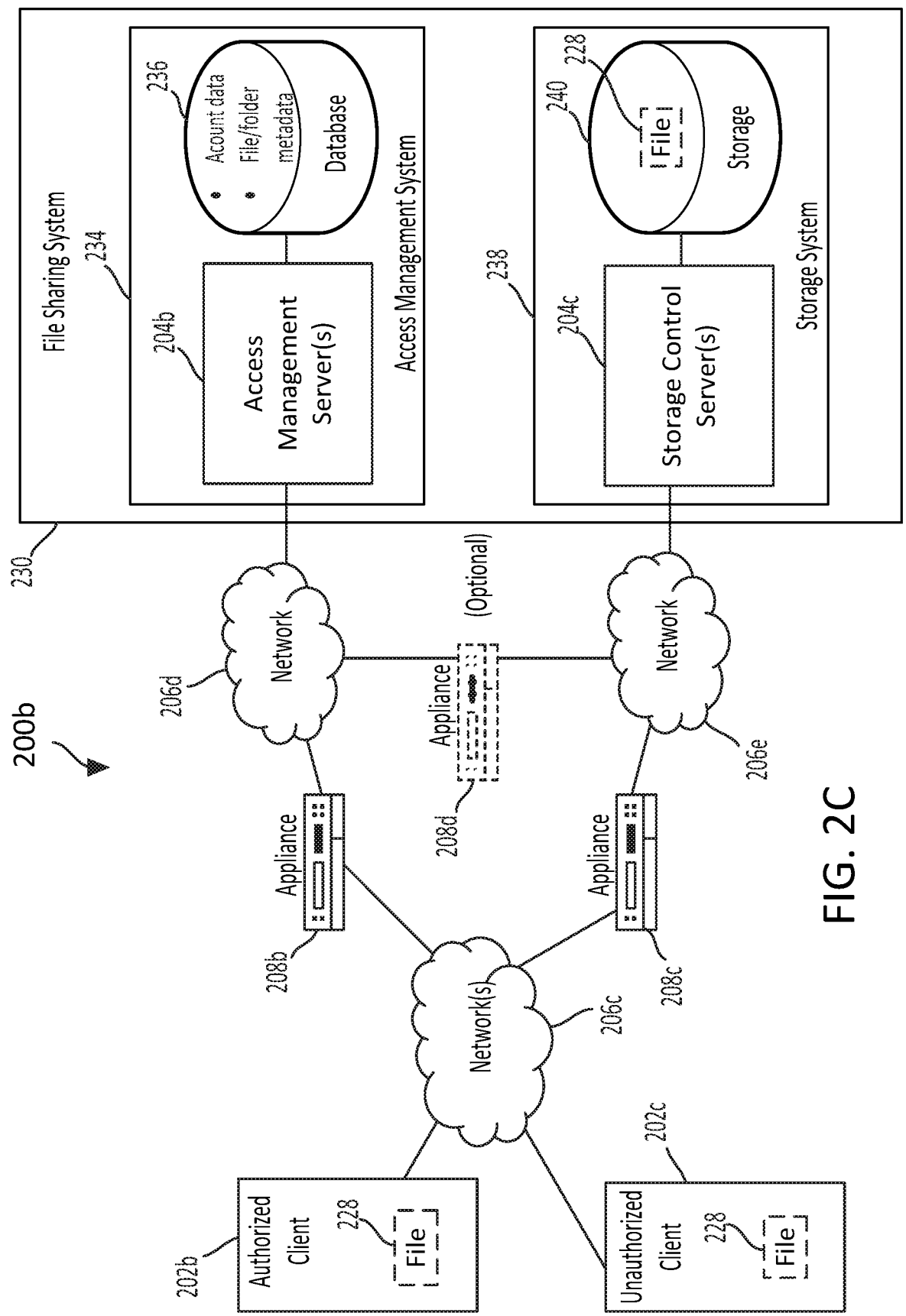
FIG. 2C is a diagram illustrating how a network computing environment like that shown in FIG. 2A may be configured to allow clients to access an example embodiment of a server-based file sharing system.

FIG. 2C shows an example network environment 200b for allowing an authorized client 202b and/or an unauthorized client 202c to upload a file 228 to a file sharing system 230 or download a file 228 from the file sharing system 230. The authorized client 202b may, for example, be a client 202 operated by a user having an active account with the file sharing system 230, while the unauthorized client 202c may be operated by a user who lacks such an account.

As FIG. 2C illustrates, in some embodiments, the file sharing system 230 may include an access management system 234 and a storage system 238. As shown, the access management system 234 may include one or more access management servers 204b and a database 236, and the storage system 238 may include one or more storage control servers 204c and a storage medium 240. In some embodiments, the access management server(s) 204b may, for example, allow a user of the client 202b to log in to his or her account, e.g., by entering a user name and password corresponding to account data stored in the database 236.

Once the user of the client 202b has logged in, the access management server 204b may enable the user to view (via the authorized client 202b) information identifying various folders represented in the storage medium 240, which is managed by the storage control server(s) 204c, as well as any files 228 contained within such folders. File/folder metadata stored in the database 236 may be used to identify the files 228 and folders in the storage medium 240 to which a particular user has been provided access rights.

In some embodiments, the clients 202b, 202c may be connected to one or more networks 206c (which may include the Internet), the access management server(s) 204b may include webservers, and an appliance 208b may load balance requests from the authorized client 202b to such webservers. The database 236 associated with the access management server(s) 204b may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202b, 202c are shown is FIG. 2C as stand-alone computers, it should be appreciated that one or both of the clients 202b, 202c shown in FIG. 2C may instead represent other types of computing devices or systems that can be operated by users. In some embodiments, for example, one or both of the authorized client 202b and the unauthorized client 202c may be implemented as a server-based virtual computing environment that can be remotely accessed using a separate computing device operated by users, such as described above in connection with FIG. 2B.

In some embodiments, the access management system 234 may be logically separated from the storage system 238, such that files 228 and other data that are transferred between clients 202 and the storage system 238 do not pass through the access management system 234. Similar to the access management server(s) 204b, one or more appliances 208b-d may load-balance requests from the clients 202b, 202c received from the network(s) 206c (which may include the Internet) to the storage control server(s) 204c. In some embodiments, the storage control server(s) 204c and/or the storage medium 240 may be hosted by a cloud-based service provider (e.g., Amazon Web Services or Microsoft Azure). In other embodiments, the storage control server(s) 204c and/or the storage medium 240 may be located at a data center managed by an enterprise of a client 202, or may be distributed among some combination of a cloud-based system and an enterprise system, or elsewhere.

After a user of the authorized client 202b has properly logged in to an access management server 204b, the server 204b may receive a request from the client 202b for access to one of the files 228 or folders to which the logged in user has access rights. The request may either be for the authorized client 202b to itself to obtain access to a file 228 or folder or to provide such access to the unauthorized client 202c. In some embodiments, in response to receiving an access request from an authorized client, the access management server 204b may communicate with the storage control server(s) 204c (e.g., either over the Internet via appliances 208b and 208c or via an appliance 208d positioned between networks 206d and 206e) to obtain a token generated by the storage control server 204c that can subsequently be used to access the identified file or folder.

In some embodiments, the generated token may, for example, be sent to the authorized client 202b, and the authorized client 202b may then send a request for a file 228, including the token, to the storage control server(s) 202c. In other embodiments, the authorized client 202b may send the generated token to the unauthorized client 202c so as to allow the unauthorized client 202c to send a request for the file 228, including the token, to the storage control server(s) 202c. In yet other embodiments, an access management server 204b may, at the direction of the authorized client 202b, send the generated token directly to the unauthorized client 202c so as to allow the unauthorized client 202c to send a request for the file 228, including the token, to the storage control server(s) 202c. In any of the forgoing scenarios, the request sent to the storage control server(s) may, in some embodiments, include a uniform resource locator (URL) that resolves to an internet protocol (IP) address of the storage control server(s) 202c, and the token may be appended to or otherwise accompany the URL. Accordingly, providing access to one or more clients 202 may be accomplished, for example, by causing the authorized client 202b to send a request to the URL address, or by sending an email, text message or other communication including the token-containing URL to the unauthorized client 202c, either directly from the access management server(s) 204b or indirectly from the access management server(s) 204b to the authorized client 202b and then from the authorized client 202b to the unauthorized client 202c. In some embodiments, selecting the URL or a user interface element corresponding to the URL, may cause a request to be sent to the storage control server(s) 204c that either causes a file 228 to be downloaded immediately to the client that sent the request, or may cause the storage control server 204c to return a webpage to the client that includes a link or other user interface element that can be selected to effect the download.

In some embodiments, a generated token can be used in a similar manner to allow either an authorized client 202b or an unauthorized client 202c to upload a file 228 to a folder corresponding to the token. In some embodiments, for example, an "upload" token can be generated as discussed above when an authorized client 202b is logged in and a designated folder is selected for uploading. Such a selection may, for example, cause a request to be sent to the access management server(s) 204b, and a webpage may be returned, along with the generated token, that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In some embodiments, sending a request including such a token to the storage control server(s) 204c (e.g., by selecting a URL or user-interface element included in an email inviting the user to upload one or more files 228 to the file sharing system 230), a webpage may be returned that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computer, a plurality of computers, or a network of distributed computers such as computer 246 shown in FIG. 2D.

Figure 2D:
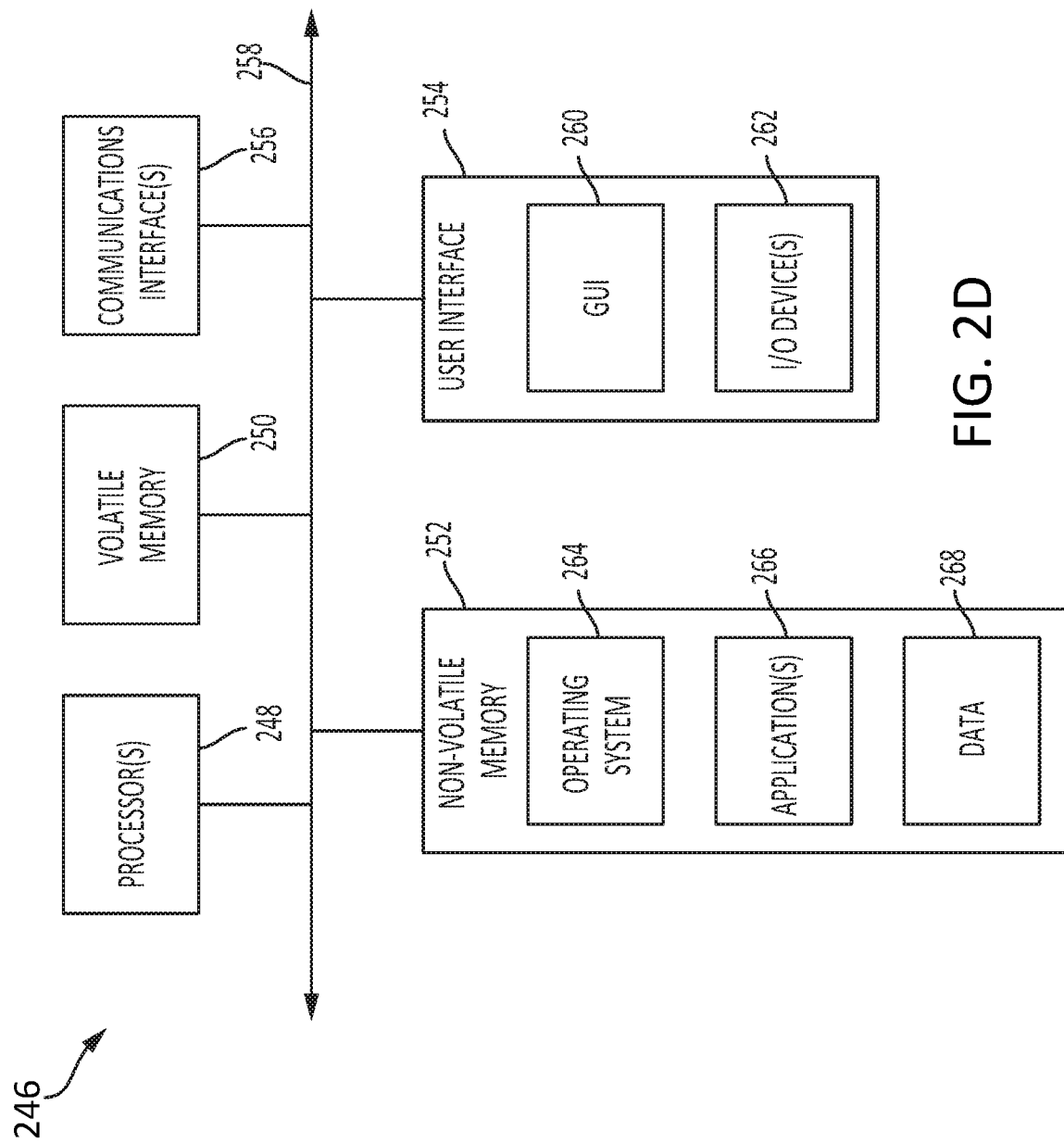
FIG. 2D is a block diagram of a computing device that may be used to implement one or more of the components of the computing environment shown in FIGS. 2A-C.

As shown in FIG. 2D, the computer 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computer 246 may communicate via communication the bus 258. The computer 246 as shown in FIG. 2D is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computer 246 to access a computer network such as a LAN, a WAN, or the Internet through a variety of wired and/or wireless or cellular connections.

As noted above, in some embodiments, one or more computers 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of the network environment 200, clients 202, servers 204, and appliances 208 and 212 may be as described in U.S. Pat. No. 9,538,345, issued Jan. 3, 2017 to Citrix Systems, Inc., of Fort Lauderdale, FL, the teachings of which are hereby incorporated herein by reference in their entirety.

C. Appliance Architecture

Figure 3:
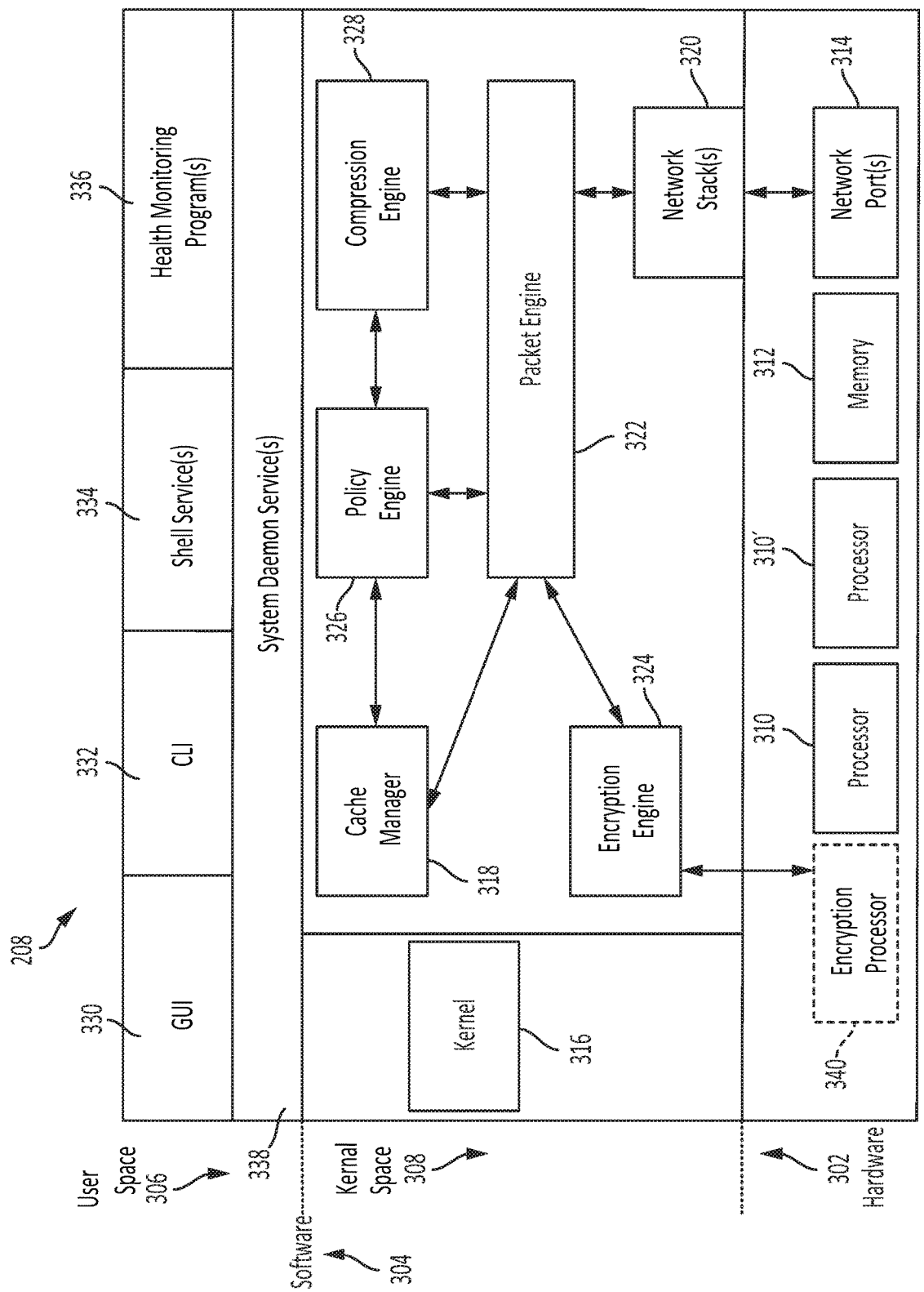
FIG. 3 is a block diagram illustrating components of an example embodiment of an appliance like those shown in FIGS. 2A-D.

FIG. 3 shows an example embodiment of an appliance 208. As described herein, the appliance 208 may be implemented as a server, gateway, router, switch, bridge or other type of computing or network device. As shown in FIG. 3, in some embodiments, the appliance 208 may include a hardware layer 302 and a software layer 304 divided into a user space 306 and a kernel space 308. The hardware layer 302 may provide the hardware elements upon which programs and services within the kernel space 308 and the user space 306 are executed, and may also allow programs and services within the kernel space 308 and the user space 306 to communicate data both internally and externally with respect to the appliance 208. As shown, the hardware layer 302 may include one or more processing units 310 for executing software programs and services, memory 312 for storing software and data, one or more network ports 314 for transmitting and receiving data over one or more networks 206, and an encryption processor 340 for encrypting and decrypting data such as in relation to Secure Socket Layer (SSL) or Transport Layer Security (TLS) processing of data transmitted and received over one or more networks 206.

An operating system (not shown in FIG. 3) of the appliance 208 allocates, manages, or otherwise segregates the available system memory into the kernel space 308 and the user space 306. The kernel space 308 may be reserved for running a kernel 316, including any device drivers, kernel extensions or other kernel related software. As known to those skilled in the art, the kernel 316 is the core of the operating system, and provides access, control, and management of resources and hardware-related elements of the appliance 208. The kernel space 308 may also include a number of network services or processes working in conjunction with a cache manager 318.

The appliance 208 may include one or more network stacks 320, such as a TCP/IP based stack, for communicating with the client(s) 202, server(s) 204, network(s) 206, and/or other appliances 208, 212. For example, the appliance 208 may establish and/or terminate one or more transport layer connections between the client(s) 202 and the server(s) 204. Each network stack 320 may include a buffer for queuing one or more network packets for transmission by the appliance 208.

The kernel space 308 may include the cache manager 318, a packet engine 322, an encryption engine 324, a policy engine 326, and a compression engine 328. One or more of the processes 318, 322, 324, 326 and 328 may thus run in the core address space of the operating system of the appliance 208, which may reduce the number of data transactions to and from the memory and/or context switches between kernel mode and user mode, for example since data obtained in kernel mode may not need to be passed or copied to a user process, thread or user level data structure.

The cache manager 318 may duplicate original data stored elsewhere or data previously computed, generated or transmitted to reducing the access time of the data. In some embodiments, the cache memory may be a data object in the memory 312 of the appliance 208, or may be a physical memory having a faster access time than memory the 312.

The policy engine 326 may include a statistical engine or other configuration mechanism to allow a user to identify, specify, define, or configure a caching policy and access, control and management of objects, data or content being cached by the appliance 208, and define or configure security, network traffic, network access, compression or other functions performed by the appliance 208.

The encryption engine 324 may process any security related protocol, such as SSL or TLS. For example, the encryption engine 324 may encrypt and decrypt network packets, or any portion thereof, communicated via the appliance 208, may setup or establish SSL, TLS or other secure connections, for example, between the client(s) 202, the server(s) 204, and/or one or more other appliances 208, 212. In some embodiments, the encryption engine 324 may use a tunneling protocol to provide a VPN between a client 202 and a server 204. For example, in some embodiments, the encryption engine 324 may be in communication with the encryption processor 340. The compression engine 328 may compress network packets bi-directionally between the client(s) 202 and the server(s) 204 and/or between one or more of the appliances 208, 212.

The packet engine 322 may manage kernel-level processing of packets received and transmitted by the appliance 208 via the network stack(s) 320 to send and receive network packets via the network port(s) 314. The packet engine 322 may, for example, operate in conjunction with the encryption engine 324, the cache manager 318, the policy engine 326, and/or the compression engine 328 to perform encryption/decryption, traffic management such as request-level content switching and request-level cache redirection, and/or compression and decompression of data.

The user space 306 may be a memory area or portion of the operating system used by user mode applications or programs otherwise running in user mode. A user mode application may, for example, not access the kernel space 316 directly and may instead use service calls in order to access kernel services. As shown in FIG. 3, the user space 306 may, for example, include a graphical user interface (GUI) 330, a command line interface (CLI) 332, one or more shell services 334, one or more health monitoring programs 336, and/or one or more daemon services 338. The GUI 330 and/or the CLI 332 may enable a system administrator or other user to interact with and control the operation of the appliance 208, such as via the operating system of the appliance 208. The shell service(s) 334 may, for example, include programs, services, tasks, processes, and/or executable instructions to support interaction with the appliance 208 by a user via the GUI 330 and/or the CLI 332.

The health monitoring program(s) 336 may monitor, check, report and/or ensure that network systems are functioning properly and that users are receiving requested content over a network, for example, by monitoring activity of the appliance 208. In some embodiments, the health monitoring program(s) 336 may intercept and inspect any network traffic passed via the appliance 208. For example, the health monitor 336 may interface with one or more of the encryption engine 324, the cache manager 318, the policy engine 326, the compression engine 328, the packet engine 322, the daemon service(s) 338, and the shell service(s) 334 to determine a state, status, operating condition, and/or health of any portion of the appliance 208. Further, the health monitoring program(s) 336 may determine if a program, process, service and/or task is active and currently running, check status, error, and/or history logs provided by any program, process, service and/or task to determine any condition, status and/or error with any portion of the appliance 208. Additionally, the health monitoring program(s) 336 may measure and monitor the performance of any application, program, process, service, task, and/or thread executing on the appliance 208.

The daemon service(s) 338 are programs that run continuously or in the background and handle periodic service requests received by the appliance 208. In some embodiments, a daemon service 338 may, for example, forward such requests to other programs and/or processes, such as another daemon service 338, as appropriate.

As described herein, the appliance 208 may relieve the server(s) 204 of much of the processing load caused by repeatedly opening and closing transport layer connections to the client(s) 202 by opening one or more transport layer connections with each server 204 and maintaining these connections to allow repeated data accesses by the client(s) 202 via the Internet (e.g., "connection pooling"). To perform connection pooling, the appliance 208 may translate or multiplex communications by modifying sequence numbers and acknowledgment numbers at the transport layer protocol level (e.g., "connection multiplexing"). The appliance 208 may also provide switching and/or load balancing for communications between the client(s) 202 and the server(s) 204.

Additional details of the implementation and operation of the appliance 208 may be as described in U.S. Pat. No. 9,538,345, issued Jan. 3, 2017, to Citrix Systems, Inc., of Fort Lauderdale, FL, the teachings of which are hereby incorporated herein by reference in their entirety.

Figure 4:
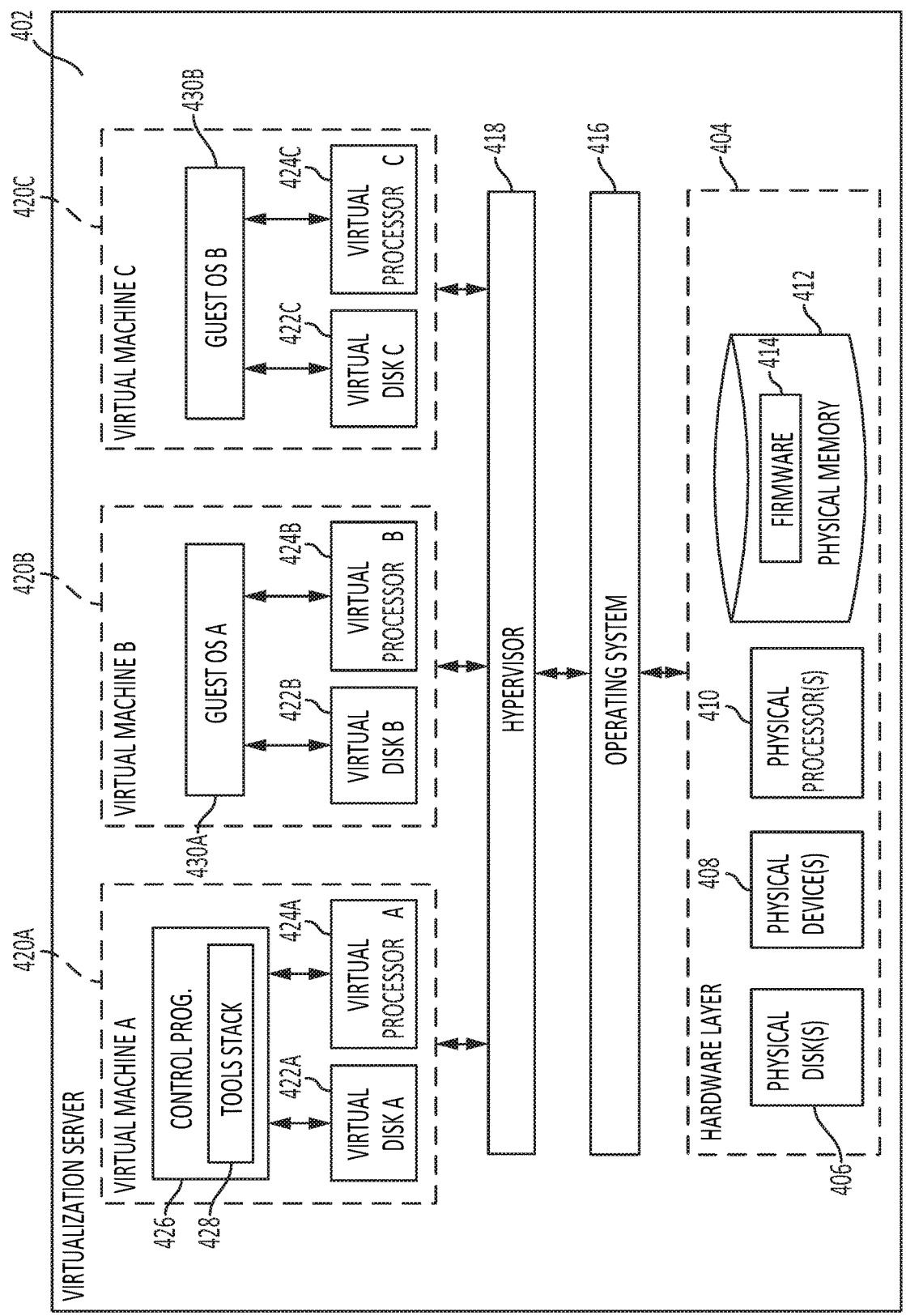
FIG. 4 is a block diagram illustrating components of an example embodiment of a server like that shown FIG. 2B.

D. Systems and Methods for Providing a Virtualized Application Delivery Controller FIG. 4 shows a high-level architecture of an illustrative application virtualization system. As shown, the application virtualization system may be single-server or multi-server system, or cloud system, including at least one virtualization server 402 configured to provide virtual desktops and/or virtual applications to one or more clients 202. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

In the example shown, a computing device is configured as a virtualization server 402 in a virtualization environment, for example, a single-server, multi-server, or cloud computing environment. The virtualization server 402 illustrated in FIG. 4 may, for example, be deployed as and/or implemented by one or more embodiments of the server 204a illustrated in FIG. 2B or by other known computing devices. Included in the virtualization server 402 is a hardware layer 404 that may include one or more physical disks 406, one or more physical devices 408, one or more physical processors 410, and/or one or more physical memories 412. Programs or executable instructions stored in the physical memory 412 may be executed by the one or more processors 410 of virtualization server 402. In some embodiments, firmware 414 may be stored within a memory element in the physical memory 412 and may likewise be executed by one or more of the physical processors 410.

The virtualization server 402 may further include an operating system 416 that may be stored in a memory element in the physical memory 412 and executed by one or more of the physical processors 410. Still further, a hypervisor 418 may be stored in a memory element in the physical memory 412 and may be executed by one or more of the physical processors 410.

Executing on one or more of the physical processors 410 may be one or more virtual machines 420A-C (generally 420). As illustrated, each virtual machine 420 may have a virtual disk 422A-C and a virtual processor 424A-C. In some embodiments, a first virtual machine 420A may execute, using a virtual processor 424A, a control program 426 that includes a tools stack 428. The control program 426 may be referred to as a control virtual machine, Dom0, Domain 0, or other virtual machine used for system administration and/or control. In some embodiments, one or more of the virtual machines 420B-C may execute, using a virtual processor 424B-C, a guest operating system 430A-B.

The physical device(s) 408 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 402. The physical memory 412 in the hardware layer 310 may include any type of memory. The physical memory 412 may store data, and in some embodiments may store one or more programs, or sets of executable instructions.

In some embodiments, the hypervisor 418 may be a program executed by one or more of the processors 410 to create and manage any number of the virtual machines 420. The hypervisor 418 may be referred to as a virtual machine monitor, or platform virtualization software. In some embodiments, the hypervisor 418 can be any combination of executable instructions and hardware that monitors virtual machines executing on a computing machine. The hypervisor 418 may, for example, be a Type 2 hypervisor, where the hypervisor executes within the operating system 416 executing on the virtualization server 402. The virtual machine(s) 420 may then execute at a level above the hypervisor 418. In some embodiments, the Type 2 hypervisor 418 may execute within the context of a user's operating system such that the Type 2 hypervisor interacts with the user's operating system. In other embodiments, one or more virtualization servers 402 in a virtualization environment may instead include a Type 1 hypervisor (not shown). A Type 1 hypervisor may, for example, execute on the virtualization server 402 by directly accessing the hardware and resources within the hardware layer 404. That is, while a Type 2 hypervisor 418 accesses system resources through a host operating system 416, as shown, a Type 1 hypervisor may directly access all system resources without the host operating system 416. A Type 1 hypervisor may thus execute directly on one or more physical processors 410 of the virtualization server 402, and may include program data stored in the physical memory 412.

The hypervisor 418, in some embodiments, may provide virtual resources to the operating system(s) 430 or control program(s) 426 executing on the virtual machine(s) 420 in any manner that simulates the operating systems 430 or control programs 426 having direct access to system resources. System resources may include, but are not limited to, the physical device(s) 408, the physical disk(s) 406, the physical processor(s) 410, the physical memory 412, and/or any other component included in virtualization server 402 hardware layer 404. The hypervisor 418 may, for example, be used to emulate virtual hardware, partition physical hardware, virtualize physical hardware, and/or execute virtual machines that provide access to computing environments. In some embodiments, the virtualization server 402 may execute a hypervisor 418 that creates a virtual machine platform on which guest operating systems may execute. In such embodiments, the virtualization server 402 may be referred to as a host server. An example of such a virtualization server is the Citrix Hypervisor™ provided by Citrix Systems, Inc., of Fort Lauderdale, FL As noted above, the hypervisor 418 may create one or more of the virtual machines 420B-C in which the guest operating systems 430 execute. In some embodiments, the hypervisor 418 may load a virtual machine image to create a virtual machine 420. In other embodiments, the hypervisor 418 may execute a guest operating system 430 within a virtual machine 420. In still other embodiments, a virtual machine 420 may execute a guest operating system 430.

In addition to creating virtual machines 420, the hypervisor 418 may control the execution of at least one virtual machine 420. In other embodiments, the hypervisor 418 may present at least one virtual machine 420 with an abstraction of at least one hardware resource provided by the virtualization server 402 (e.g., any hardware resource available within the hardware layer 404). In other embodiments, the hypervisor 418 may control the manner in which the virtual machines 420 access the physical processor(s) 410 available in the virtualization server 402. Controlling access to the physical processor(s) 410 may include determining whether a virtual machine 420 should have access to a processor 410, and how physical processor capabilities are presented to the virtual machine 420.

In some embodiments, VMs 420 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Each of the virtual machines 420 may be implemented by way of a set of executable instructions that, when executed by a processor 410, may imitate the operation of a physical computer such that the virtual machine 420 can execute programs and processes much like a physical computing device. While FIG. 4 illustrates an embodiment in which a virtualization server 402 hosts three virtual machines 420, in other embodiments the virtualization server 402 can host any number of virtual machines 420. The hypervisor 418, in some embodiments, may provide each virtual machine 420 with a unique virtual view of the physical hardware, memory, processor, and other system resources available to that virtual machine 420. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, the hypervisor 418 may create one or more unsecure virtual machines 420 and one or more secure virtual machines 420. Unsecure virtual machines 420 may be prevented from accessing resources, hardware, memory locations, and programs that secure virtual machines 420 may be permitted to access. In other embodiments, the hypervisor 418 may provide each virtual machine 420 with a substantially similar virtual view of the physical hardware, memory, processor, and other system resources available to the virtual machines 420.

The virtual disk(s) 422, in some embodiments, provide a virtualized view of one or more of the physical disks 406 of the virtualization server 402, or a portion of one or more of the physical disks 406. The virtualized view of the physical disk(s) 406 may be generated, provided, and/or managed by the hypervisor 418. In some embodiments, the hypervisor 418 may provide each virtual machine 420 with a unique view of the physical disk(s) 406. Thus, in such embodiments, the particular virtual disk 422 included in each virtual machine 420 may be unique when compared with the other virtual disks 422.

In some embodiments, each virtual processor 424 may provide a virtualized view of one or more of the physical processors 410 of the virtualization server 402. In some embodiments, the virtualized view of the physical processor(s) 410 may be generated, provided, and/or managed by the hypervisor 418. In some embodiments, one or more of the virtual processors 424 may have substantially all of the same characteristics of at least one of the physical processors 410. In other embodiments, one or more of the virtual processors 424 may provide a modified view of a physical processor 410 such that at least some of the characteristics of the virtual processor 424 are different than the characteristics of the corresponding physical processor 410.

Although shown in FIG. 4 as including a single virtualized device 402, a virtualized environment may be provided by a plurality of networked devices in a system in which at least one physical host executes a virtual machine. A device on which a VM executes may be referred to as a physical host and/or a host machine. For example, an appliance 208 may be additionally or alternatively implemented in a virtualized environment on any computing device, such as a client 202, a server 204, or an appliance 208. Such virtual appliances may, for example, provide functionality for availability, performance, health monitoring, caching and compression, connection multiplexing and pooling and/or security processing (e.g., firewall, VPN, encryption/decryption, etc.), similarly as described in regard to the appliance 208.

Additional details of the implementation and operation of a virtualized computing environment may be as described in U.S. Pat. No. 9,538,345, issued Jan. 3, 2017 to Citrix Systems, Inc. of Fort Lauderdale, FL, the teachings of which are hereby incorporated herein by reference in their entirety.

In some embodiments, a server may execute multiple virtual machines 420, for example, on various cores of a multi-core processing system and/or various processors of a multiple processor device. For example, one or more of the processors 248 shown in FIG. 2D may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment on a client 202, server 204 or appliance 208, 212, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017, to Citrix Systems, Inc., of Fort Lauderdale, FL, the teachings of which are hereby incorporated herein by reference in their entirety.

E. Systems and Methods for Providing File Sharing Over Network(s)

Figure 5A:
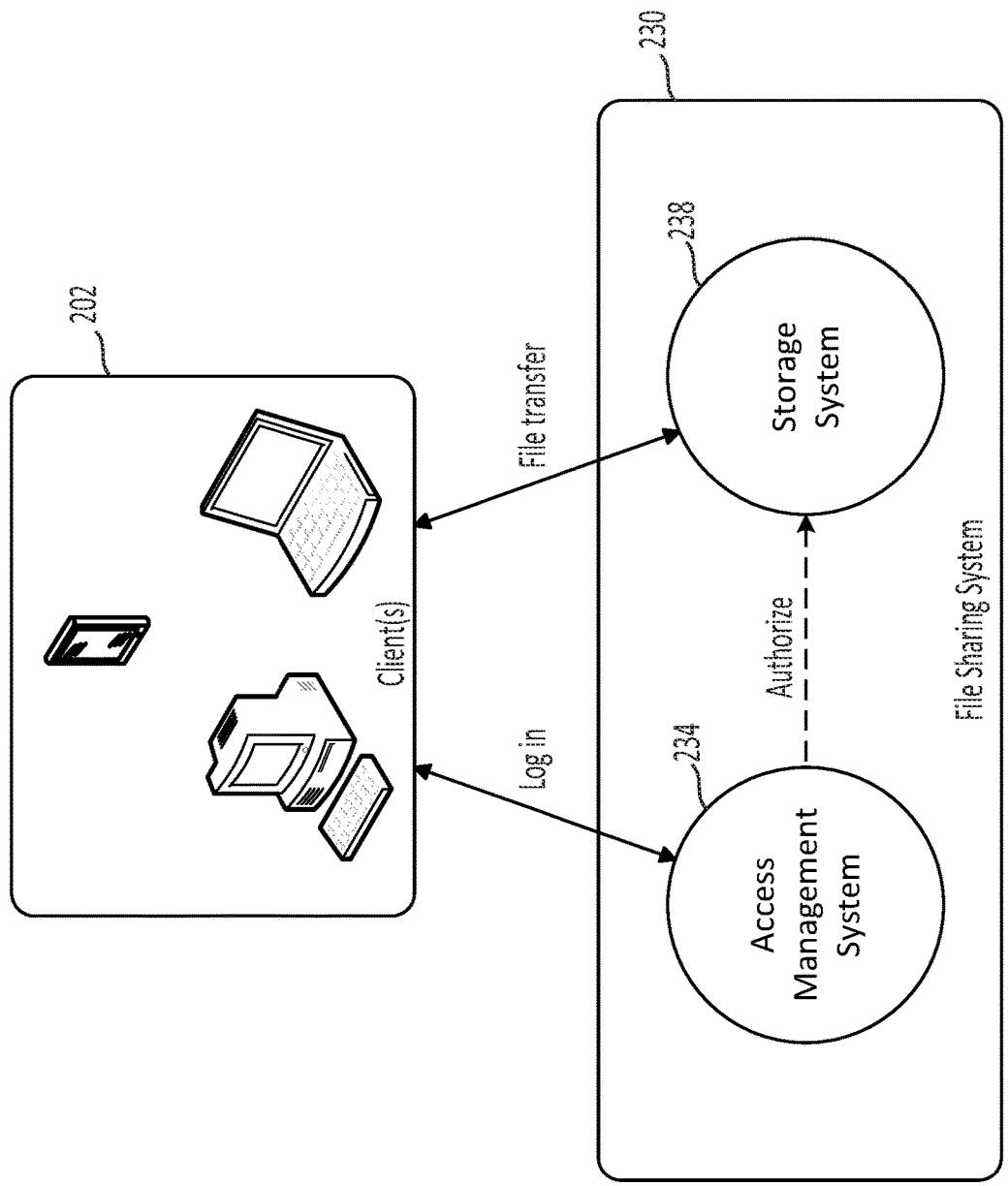
FIG. 5A is a diagram illustrating certain operations that may be performed by the file sharing system shown in FIG. 2C in accordance with some embodiments.

As discussed above in connection with FIG. 2C, in some embodiments, a file sharing system may be distributed between two sub-systems, with one subsystem (e.g., the access management system 234) being responsible for controlling access to files 228 stored in the other subsystem (e.g., the storage system 238). FIG. 5A illustrates conceptually how one or more clients 202 may interact with two such subsystems.

As shown in FIG. 5A, an authorized user operating a client 202, which may take on any of numerous forms, may log in to the access management system 234, for example, by entering a valid user name and password. In some embodiments, the access management system 234 may include one or more webservers that respond to requests from the client 202. The access management system 234 may store metadata concerning the identity and arrangements of files 228 (shown in FIG. 2C) stored by the storage system 238, such as folders maintained by the storage system 238 and any files 228 contained within such folders. In some embodiments, the metadata may also include permission metadata identifying the folders and files each user is allowed to access. Once logged in, the user may employ a user-interface mechanism of the client 202 to navigate among folders for which the metadata indicates the user has access permission.

In some embodiments, the logged-in user may select a particular file 228 the user wants to access and/or to which the logged-in user wants a different user of a different client 202 to be able to access. Upon receiving such a selection from a client 202, the access management system 234 may take steps to authorize access to the selected file 228 by the logged-in client 202 and/or the different client 202. In some embodiments, for example, the access management system 234 may interact with the storage system 238 to obtain a unique "download" token which may subsequently be used by a client 202 to retrieve the identified file 228 from the storage system 238. The access management system 234 may, for example, send the download token to the logged-in client 202 and/or a client 202 operated by a different user. In some embodiments, the download token may a single-use token that expires after its first use.

In some embodiments, the storage system 238 may also include one or more webservers and may respond to requests from clients 202. In such embodiments, one or more files 228 may be transferred from the storage system 238 to a client 202 in response to a request that includes the download token. In some embodiments, for example, the download token may be appended to a URL that resolves to an IP address of the webserver(s) of the storage system 238. Access to a given file 228 may thus, for example, be enabled by a "download link" that includes the URL/token. Such a download link may, for example, be sent the logged-in client 202 in the form of a "DOWNLOAD" button or other user-interface element the user can select to effect the transfer of the file 228 from the storage system 238 to the client 202. Alternatively, the download link may be sent to a different client 202 operated by an individual with which the logged-in user desires to share the file 228. For example, in some embodiments, the access management system 234 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 234 and cut-and-paste or otherwise copy the download link into an email or other message the logged in user can then send to the other client 202 to enable the other client 202 to retrieve the file 228 from the storage system 238.

In some embodiments, a logged-in user may select a folder on the file sharing system to which the user wants to transfer one or more files 228 (shown in FIG. 2C) from the logged-in client 202, or to which the logged-in user wants to allow a different user of a different client 202 to transfer one or more files 228. Additionally or alternatively, the logged-in user may identify one or more different users (e.g., by entering their email addresses) the logged-in user wants to be able to access one or more files 228 currently accessible to the logged-in client 202.

Similar to the file downloading process described above, upon receiving such a selection from a client 202, the access management system 234 may take steps to authorize access to the selected folder by the logged-in client 202 and/or the different client 202. In some embodiments, for example, the access management system 234 may interact with the storage system 238 to obtain a unique "upload token" which may subsequently be used by a client 202 to transfer one or more files 228 from the client 202 to the storage system 238. The access management system 234 may, for example, send the upload token to the logged-in client 202 and/or a client 202 operated by a different user.

One or more files 228 may be transferred from a client 202 to the storage system 238 in response to a request that includes the upload token. In some embodiments, for example, the upload token may be appended to a URL that resolves to an IP address of the webserver(s) of the storage system 238. For example, in some embodiments, in response to a logged-in user selecting a folder to which the user desires to transfer one or more files 228 and/or identifying one or more intended recipients of such files, the access management system 234 may return a webpage requesting that the user drag-and-drop or otherwise identify the file(s) 228 the user desires to transfer to the selected folder and/or a designated recipient. The returned webpage may also include an "upload link," e.g., in the form of an "UPLOAD" button or other user-interface element that the user can select to effect the transfer of the file(s) 228 from the client 202 to the storage system 238.

In some embodiments, in response to a logged-in user selecting a folder to which the user wants to enable a different client 202 operated by a different user to transfer one or more files 228, the access management system 234 may generate an upload link that may be sent to the different client 202. For example, in some embodiments, the access management system 234 may send an email or other message to the different client 202 that includes a message indicating that the different user has been authorized to transfer one or more files 228 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 228 the different user wishes to upload to the file sharing system 230. The returned webpage may also include a user-interface element, e.g., in the form of an "UPLOAD" button, that the different user can select to effect the transfer of the file(s) 228 from the client 202 to the storage system 238. In other embodiments, the logged-in user may receive the upload link from the access management system 234 and may cut-and-paste or otherwise copy the upload link into an email or other message the logged-in user can then send to the different client 202 to enable the different client to upload one or more files 228 to the storage system 238.

In some embodiments, in response to one or more files 228 being uploaded to a folder, the storage system 238 may send a message to the access management system 234 indicating that the file(s) 228 have been successfully uploaded, and an access management system 234 may, in turn, send an email or other message to one or more users indicating the same. For user's that have accounts with the file sharing system 230, for example, a message may be sent to the account holder that includes a download link that the account holder can select to effect the transfer of the file 228 from the storage system 238 to the client 202 operated by the account holder. Alternatively, the message to the account holder may include a link to a webpage from the access management system 234 inviting the account holder to log in to retrieve the transferred files 228. Likewise, in circumstances in which a logged-in user identifies one or more intended recipients for one or more to-be-uploaded files 228 (e.g., by entering their email addresses), the access management system 234 may send a message including a download link to the designated recipients (e.g., in the manner described above), which such designated recipients can then use to effect the transfer of the file(s) 228 from the storage system 238 to the client(s) 202 operated by those designated recipients.

Figure 5B:
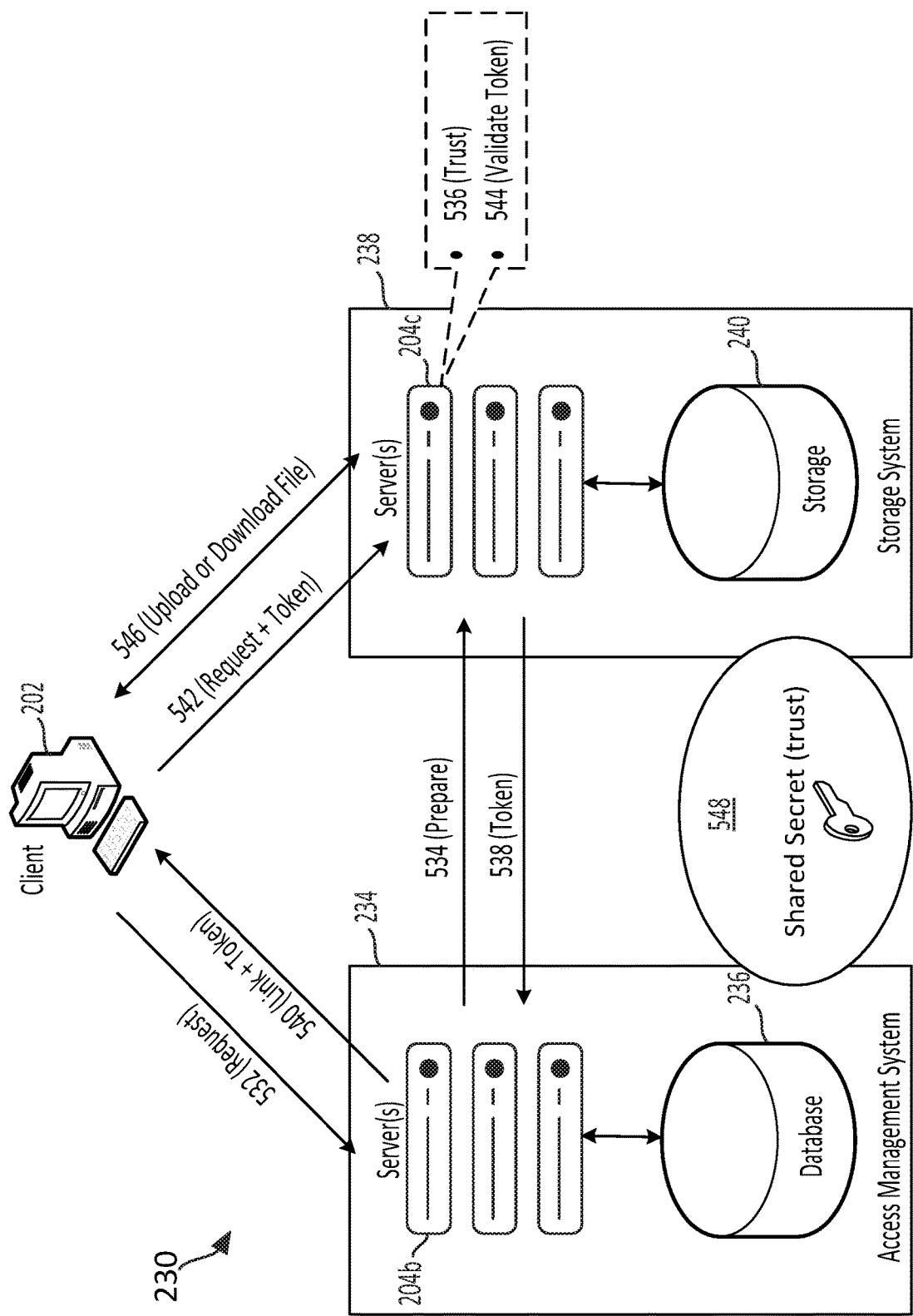
FIG. 5B is a diagram illustrating additional operations that may be performed by the file sharing system shown in FIG. 2C in accordance with some embodiments.

FIG. 5B is a block diagram showing an example of a process for generating access tokens (e.g., the upload tokens and download tokens discussed above) within the file sharing system 230 described in connection with FIGS. 2C and 5A.

As shown, in some embodiments, a logged-in client 202 may initiate the access token generation process by sending an access request 532 to the access management server(s) 204b. As noted above, the access request 532 may, for example, correspond to one or more of (A) a request to enable the downloading of one or more files 228 (shown in FIG. 2C) from the storage system 238 to the logged-in client 202, (B) a request to enable the downloading of one or more files 228 from the storage system 238 to a different client 202 operated by a different user, (C) a request to enable the uploading of one or more files 228 from a logged-in client 202 to a folder on the storage system 238, (D) a request to enable the uploading of one or more files 228 from a different client 202 operated by a different user to a folder of the storage system 238, (E) a request to enable the transfer of one or more files 228, via the storage system 238, from a logged-in client 202 to a different client 202 operated by a different user, or (F) a request to enable the transfer of one or more files 228, via the storage system 238, from a different client 202 operated by a different user to a logged-in client 202.

In response to receiving the access request 532, an access management server 204b may send a "prepare" message 534 to the storage control server(s) 204c of the storage system 238, identifying the type of action indicated in the request, as well as the identity and/or location within the storage medium 240 of any applicable folders and/or files 228. As shown, in some embodiments, a trust relationship may be established (step 536) between the storage control server(s) 204c and the access management server(s) 204b. In some embodiments, for example, the storage control server(s) 204c may establish the trust relationship by validating a hash-based message authentication code (HMAC) based on shared secret or key 548).

After the trust relationship has been established, the storage control server(s) 204c may generate and send (step 538) to the access management server(s) 204b a unique upload token and/or a unique download token, such as those as discussed above.

After the access management server(s) 204b receive a token from the storage control server(s) 204c, the access management server(s) 204b may prepare and send a link 540 including the token to one or more client(s) 202. In some embodiments, for example, the link may contain a fully qualified domain name (FQDN) of the storage control server(s) 204c, together with the token. As discussed above, the link 540 may be sent to the logged-in client 202 and/or to a different client 202 operated by a different user, depending on the operation that was indicated by the request.

The client(s) 202 that receive the token may thereafter send a request 542 (which includes the token) to the storage control server(s) 204c. In response to receiving the request, the storage control server(s) 204c may validate (step 544) the token and, if the validation is successful, the storage control server(s) 204c may interact with the client(s) 202 to effect the transfer (step 546) of the pertinent file(s) 228, as discussed above.

F. Systems and Methods for Implementing Servers in a Cloud-Based Environment

Figure 6:
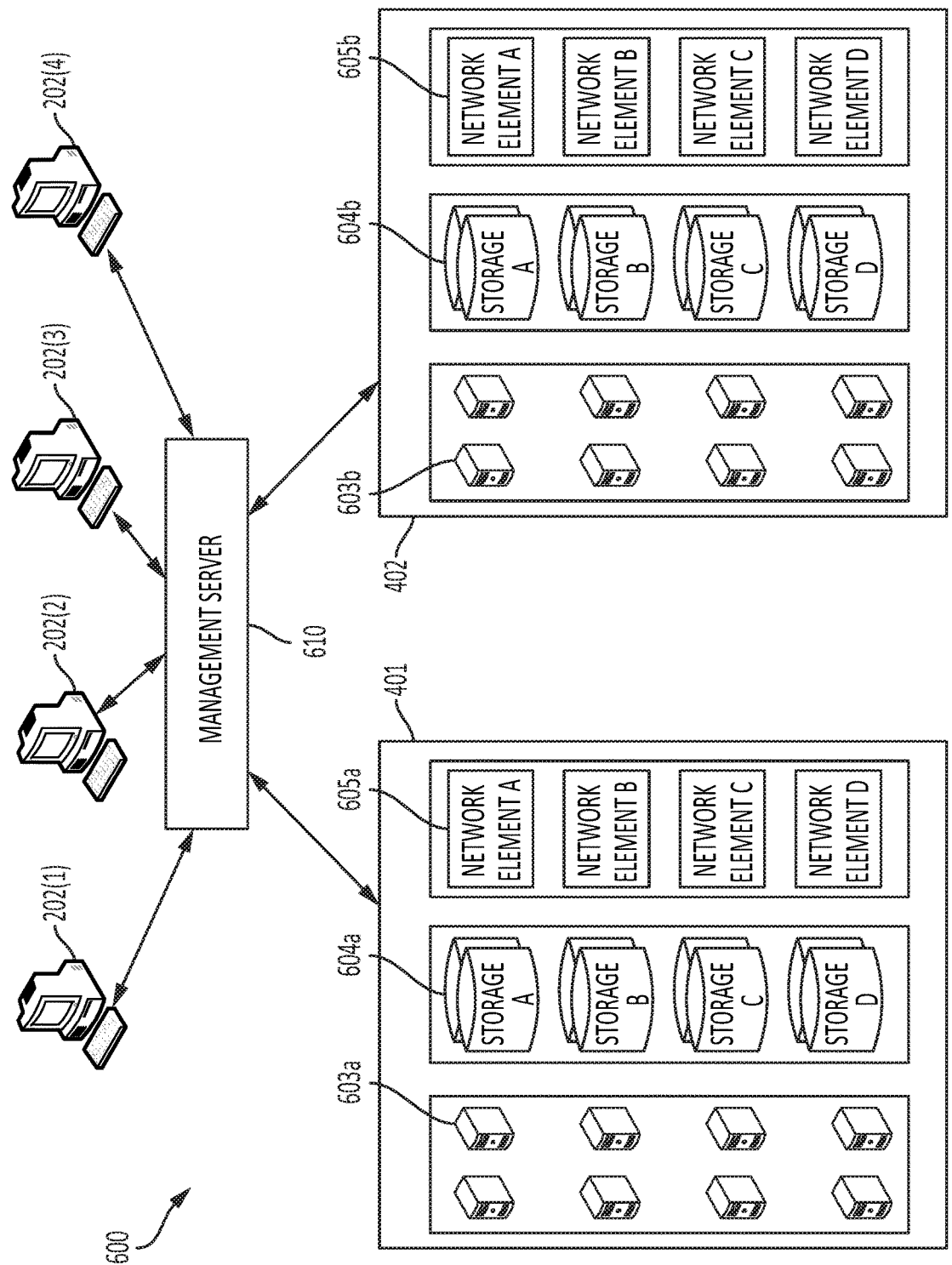
FIG. 6 is diagram illustrating an example cloud-based computing environment that may be used to implement one or more components of the networking systems shown in FIGS. 2A-D in some embodiments.

It should be appreciated that, in some embodiments, various aspects described herein may be implemented in a cloud-based environment. FIG. 6 illustrates an example of a cloud computing environment (or cloud system) 600. As seen in FIG. 6, one or more clients 202 may communicate with a cloud management server 610 to access the computing resources (e.g., host servers 603a-603b (generally referred herein as "host servers 603"), storage resources 604a-604b (generally referred herein as "storage resources 604"), and network resources 605a-605A (generally referred herein as "network resources 605")) of the cloud system 600.

The management server 610 may, for example, be implemented on one or more physical servers. In some embodiments, for example, the management server 610 may run, for example, Citrix Cloud™ by Citrix Systems, Inc., of Ft. Lauderdale, FL, or OPENSTACK, among others. The management server 610 may manage various computing resources, including cloud hardware and software resources, for example, the host computers 603, the data storage devices 604, and the networking devices 605. The cloud hardware and software resources may include private and/or public components. For example, a cloud may be configured as a private cloud to be used by one or more particular customers or clients 202 and/or over a private network. In other embodiments, public clouds or hybrid public-private clouds may be used by other customers over an open or hybrid networks.

In some embodiments, the management server 610 may be configured to provide user interfaces through which cloud operators and cloud customers may interact with the cloud system 600. For example, the management server 610 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and/or perform other cloud administration tasks. The management server 610 may also include a set of APIs and/or one or more customer console applications with user interfaces configured to receive cloud computing requests from end users via clients 202, for example, requests to create, modify, and/or destroy virtual machines within the cloud. The clients 202 may connect to management server 610 via the Internet or some other communication network, and may request access to one or more of the computing resources managed by management server 610. In response to client requests, the management server 610 may include a resource manager configured to select and provision physical resources in the hardware layer of the cloud system based on the client requests. For example, the management server 610 and/or additional components of the cloud system may be configured to provision, create, and/or manage virtual machines and their operating environments (e.g., hypervisors, storage resources, services offered by the network elements, etc.) for customers at clients 202, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 202 may be related, for example, different computers creating virtual machines on behalf of the same end user, or different users affiliated with the same company or organization. In other examples, certain clients 202 may be unrelated, such as users affiliated with different companies or organizations. For unrelated clients, information on the virtual machines or storage of any one user may be hidden from other users.

Referring now to the physical hardware layer of a cloud computing environment, availability zones 601-602 (or zones) may refer to a collocated set of physical computing resources. Zones may be geographically separated from other zones in the overall cloud of computing resources. For example, zone 601 may be a first cloud datacenter located in California, and zone 602 may be a second cloud datacenter located in Florida. The management server 610 may be located at one of the availability zones, or at a separate location. Each zone may include an internal network that interfaces with devices that are outside of the zone, such as the management server 610, through a gateway. End users of the cloud (e.g., clients 202) might or might not be aware of the distinctions between zones. For example, an end user may request the creation of a virtual machine having a specified amount of memory, processing power, and network capabilities. The management server 610 may respond to the user's request and may allocate the resources to create the virtual machine without the user knowing whether the virtual machine was created using resources from zone 601 or zone 602. In other examples, the cloud system may allow end users to request that virtual machines (or other cloud resources) are allocated in a specific zone or on specific resources 603-605 within a zone.

In this example, each zone 601-602 may include an arrangement of various physical hardware components (or computing resources) 603-605, for example, physical hosting resources (or processing resources), physical network resources, physical storage resources, switches, and additional hardware resources that may be used to provide cloud computing services to customers. The physical hosting resources in a cloud zone 601-602 may include one or more computer servers 204, such as the virtualization server(s) 204a, the access management server(s) 204b, and/or the storage control server(s) 204c described above, which may be configured to create and host virtual machine instances. The physical network resources in a cloud zone 601 or 602 may include one or more network elements 605 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 601-602 may include storage disks (e.g., solid state drives (SSDs), magnetic hard disks, etc.) and other storage devices.

The example cloud computing environment shown in FIG. 6 also may include a virtualization layer (e.g., as shown in FIGS. 2b and 5) with additional hardware and/or software resources configured to create and manage virtual machines and provide other services to customers using the physical resources in the cloud. The virtualization layer may include hypervisors, as described above in FIG. 4, along with other components to provide network virtualizations, storage virtualizations, etc. The virtualization layer may be implemented as a separate layer from the physical resource layer, or may share some or all of the same hardware and/or software resources with the physical resource layer. For example, the virtualization layer may include a hypervisor installed in each of the virtualization servers 502 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

G. Detailed Description of Example Embodiments of a Data Access Control System

Figure 7:
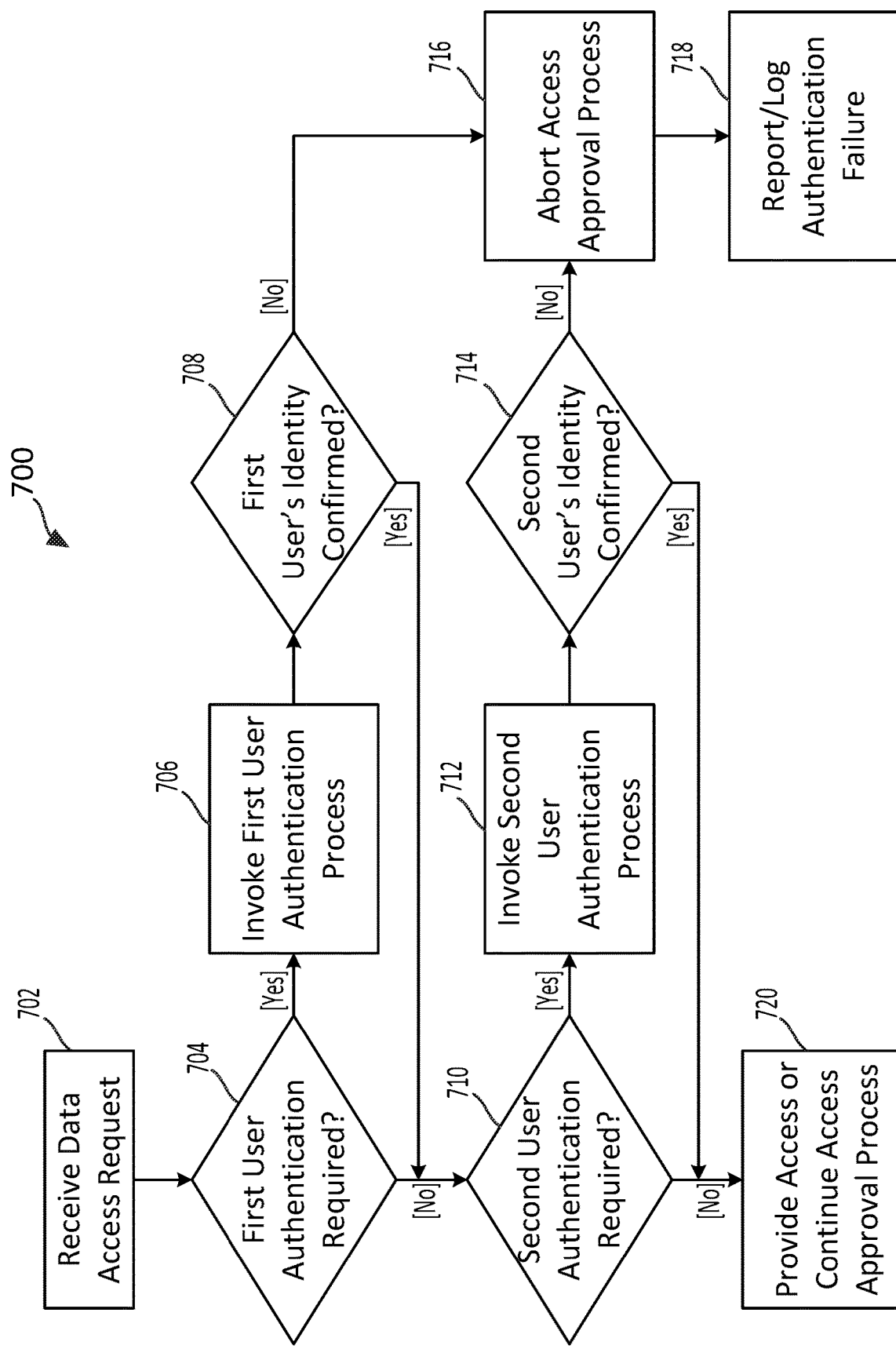
FIG. 7 is a flow chart illustrating an example of a process that may be performed by a data access control system such as that shown in FIG. 1 in accordance with some embodiments.

FIG. 7 is a flow chart illustrating an example routine 700 that may be executed by one or more processors included in a data access control system 102, such as that shown in FIG. 1, to regulate access to files (or other data) by a remote device (e.g., the first device 104 shown in FIG. 1). For example, in some embodiments, one or more computer-readable media in the system 102 may be encoded with instructions which, when executed by such processor(s), cause the system 102 to perform some or all of the routine 700. In some embodiments, the data access control system 102 may include, or be implemented in conjunction with, the file sharing system 230 shown in FIGS. 2C, 5A, and 5B, and the routine 700 may be implemented using one or more of the access management servers 204b and/or one or more of the storage control servers 204c, or some other computing device(s). In other embodiments, the data access control system 102 may include, or be implemented in conjunction with, the application delivery system shown in FIGS. 2B and 4, and some or all of the routine 700 may be implemented using one of the servers 204a, 502 and/or one of the virtual machines 520, or some other computing device(s).

In yet other embodiments, the data access control system 102 may be implemented as a service called by, or otherwise operated in conjunction with, a file sharing system or an application delivery system such as those described herein, or by a file sharing system or an application delivery system having a different configuration.

In still other embodiments, the data access control system 102 may be implemented as a service called by, or otherwise operated in conjunction with, individual clients 104, 202 (or by an application delivery system that delivers a computing environment to such clients) to obtain a decryption key needed to open an encrypted file, application, or other data.

As shown in FIG. 7, the routine 700 may begin at a step 702 in response to receipt of a request to access a file, application, or other data. In some embodiments, the data access request of the step 702 may correspond, for example, to a request by a client 202 who has already logged in to a file sharing system, such as the access request 532 shown in FIG. 5B. In such an implementation, some or all of the routine 700 may be implemented by the access management server(s) 204b or by one or more servers associated therewith, or by a corresponding component in a different type of file sharing system.

In other embodiments, the data access request of the step 702 may correspond, for example, to a request by a client 202 who is attempting to gain access to a computing environment to be delivered by an application delivery system, or to an application to be delivered by such a computing environment, such as described above in connection with FIGS. 2B and 4. In such an implementation, some or all of the routine 700 may be implemented by one or more of the servers 204a, 502 and/or virtual machines 520, by one or more other computing devices, or by a corresponding component in a different type of application delivery system.

In other embodiments, the data access request of the step 702 may correspond to a request to download a file from a secure storage system, using a download token or other identifier, such as the request 542 shown in FIG. 5B. In such an implementation, the routine 700 may be performed in whole or in part using the storage control server(s) 204c, or one or more servers 204 associated with the storage control server(s) 204c, or may be performed as a service by the access management server(s) 204b, or one or more servers associated with the access management server(s) 204b, in response to a function call by a storage control server 204c that receives such a download request. In other embodiments, a download request including a token may be initially directed from a client 202 to the access management server(s) 204b for performance of the routine 700, and the routine 700 may result in a download link to the storage control server(s) being sent to the client 202. In yet other embodiments, the data access request of the step 702 may correspond to a request by a client 202 for on-line access to a file or other data maintained on a server-based storage system.

In yet other embodiments, the data access request of the step 702 may additionally or alternatively correspond to a message sent from the first device 104 in response to the first user 106 attempting to access a file, application, or other resource already present on the first device 104. For example, in some embodiments, as noted above, each time a file, application, etc., is uploaded or otherwise provided to the data access control system 102, or an associated file sharing system, application delivery system, or other repository, the file, application, etc., may be encrypted using unique public and private keys. In other embodiments, a file, application, etc., may be encrypted based on security settings set by the author of the same. In any such embodiments, the routine 700 may result in a decryption key being sent to the first device 104 to allow the file, application, etc., to be decrypted.

In some embodiments, the data access request of the step 702 may be generated by an application on the first device 104 that is used to attempt to open or access the file or other data. Such an application may, for example, be a mobile or desktop application installed on the first device 104 before an encrypted file or other data is received or otherwise accessed. Citrix ShareFile® offered by Citrix Systems, Inc., of Fort Lauderdale, FL, is one example of such a preinstalled application. In other embodiments, an encrypted file or other data and an application for accessing the file or other data may be combined into an executable container, and such a container may be sent, e.g., from a file sharing system or other device or system, to the first device 104. When such a container is subsequently executed by the first device 104, the embedded application may generate and send the access request of the step 114 to the system 102. Examples of techniques that may be used to containerize files or other data with applications in this manner are described, for example, in U.S. Pat. No. 10,868,855, pending application entitled "FILE CONTAINERIZATION AND MANAGEMENT," the entire contents of which are hereby incorporated by reference.

In still other embodiments, the data access request of the step 702 may correspond to a request that is sent from a client 202 to a file storage system, application delivery system, or other repository system, to which access is not controlled other than by way of the routine 700.

As shown in FIG. 7, the routine 700 may involve, at steps 704 and 710, determining whether authentication of the first user 106 (i.e., the person operating the first device 104 who wants to access one or more files or other data) and/or one or more additional individuals (e.g., the second user 110 who authored, uploaded, or encrypted the file(s) or other data, the first user's supervisor, one or more members of a delegate group, etc.) is required before access to the file(s) or other data is to be provided to the first device 104. The determination of whether authentication of the first and/or a second user is required may be made in any of a number of ways. In some embodiments, for example, individual files, applications, etc., may be assigned classifications and/or metadata may be associated with each file, application, etc. (e.g., metadata in the database 236 of the access management system 234) stored in a storage system (e.g., the storage system 238) that indicates whether and/or how authentication of the first and/or second users is to be performed.

In other embodiments, accounts of individual users of a file sharing system, application delivery system, etc., may additionally or alternatively specify whether and/or how the identity of that user and/or other individuals need to be authenticated to access some or all file and/or application types. In yet other embodiments, metadata may additionally or alternatively be embedded within a file or application itself, e.g., as one or more security settings, or may be embedded within a container in which such a file or application is embedded, that indicates whether and/or how authentication of the first and/or a second user needs to be performed to obtain a decryption key for the file, application, etc.

In some embodiments, the second user 110 may be one of several members of a delegated authority group. In such a circumstance, rather than identifying a single second user 110 whose identity needs to be authenticated, the metadata associated with a file, application, etc., may indicate that authentication of at least one member of the group, or perhaps a certain number or even all members of the group, needs to be achieved for the first device 104 to be provided access to the file or other data. Accordingly, in some embodiments, the second user 110 described herein may actually correspond to a group of individuals, rather than being just one user.

Based on the classification of a file, application, etc., different types or levels of authorization may be defined and/or applied for the data in question. In some embodiments, for example, a file (or other data) may be designated as "Highly-Sensitive Classified." In such a case, authentication of both the first user 106 and the second user(s) 110 may be required each time the first device 104 is to be provided access to the file (or other data). In some embodiments, a time constraint may additionally or alternatively be placed on how long the first device 104 is permitted to access the file (or other data), thus allowing the first device 104 to access the file (or other data) for only a pre-defined period of time following each such authentication process. As another example, a file (or other data) may be designated simply as "Classified." When so designated, the authorization process may, for example, be required only the first time access to the file (or other data) is provided to the first device 104. Thus, with this designation, following the initial authentication process, the first device 104 may be able to access the file (or other data) repeatedly unless and until the authorization is subsequently revoked, e.g., in response to a request by the second user 110. As yet another example, a file (or other data) may be given an even lower classification so as to enable the first user 106 to both download and edit the file (or other data) repeatedly following the initial authentication process. In some embodiments, some files (or other data) may also be designated as "Non-Classified" and access to such files (or other data) may, for example, be provided to the first device 104 without requiring authentication of the first or a second user as described herein.

As FIG. 7 illustrates, if it is determined at steps 704 and 710 that authentication of either or both of the first user 106 and one or more second users 110 is required, then the routine 700 may proceed to steps 706 and/or 712 at which a corresponding process for authenticating the identity of such user(s) may be invoked. The authentication processes for the first and second users may be the same or they may be different, in whole or in part.

In some embodiments, the authentication process for the first user 106 may involve collecting information input by the first user 106 to the first device 104, and comparing the collected information with stored authentication information associated with an account of the first user 106. If the collected information matches the stored information then, then the identity of the first user 106 may be confirmed at a step 708, and the routine 700 may proceed to the step 710. If on the other hand, the collected information does not match the stored information, then the identity of the first user 106 may not be confirmed at the step 708, and the routine 700 may instead proceed to a step 716 (described below).

In some embodiments, the step 706 may involve relying on an authentication service in whole or in part to authenticate the identity of the first user 106 of the first device 104. In such implementations, the data access control system 102 may, for example, send a request to a separate authentication service that includes an indication of the expected identity of the first user 106, and the authentication service may perform a process for determining whether the person operating the first device 104 is, in fact, the first user 106. In some embodiments, such a process may likewise involve collecting information from the person operating the first device 104 and determining whether the collected information matches stored information for the first user 106. Examples of information that may be collected from the first user 106 are provided below. For embodiments that employ an authentication service, the step 708 may thus involve evaluating the response received from the authentication service to determine whether or not the service was able to confirm the first user's identity.

In some embodiments, the authentication process invoked (step 712) for each second user 110 may also or instead involve collecting information input by the person operating the second device 108, and comparing the collected information with stored authentication information associated with an account of the second user 110. If the collected information matches the stored information, then the identity of the second user 110 may be confirmed at a step 714, and the routine 700 may proceed to a step 720 (described below). If on the other hand, the collected information does not match the stored information, then the identity of the second user(s) 110 may not be confirmed at the step 714, and the routine may instead proceed to the step 716 (also described below).

As was the case for the first user, in some embodiments, the step 712 may involve relying on an authentication service, which may be the same as or different than an authentication service that may be used to authenticate the identity of the first user 106, to authenticate the identity of the second user(s) 110 of the second device(s) 108. In such implementations, the data access control system 102 may, for example, send a request to a separate authentication service that includes an indication of the expected identity of each second user 110, and the authentication service may perform a process for determining whether each person operating a second device 108 is, in fact, the correct second user 110. In some embodiments, such a process may likewise involve collecting information from each person operating a second device 108 and determining whether the collected information matches stored information for the correct second user 110. Examples of information that may be collected from the second user(s) 110 are provided below. For embodiments that employ an authentication service, the step 714 may thus involve evaluating the response received from the authentication service to determine whether or not the service was able to confirm each second user's identity. In embodiments in which the identity of more than one second user 110 is to be authenticated, the step 712 may thus involve invoking a separate authentication process for each such second user 110, and the step 714 may involve separately confirming each second user's identity has been authenticated.

In some embodiments, a determination may be made as to whether the first user's identity has been authenticated within a first window of time following receipt of the request at the step 702, and the routine 700 may proceed to the step 720 only if it is determined that the first user's identity was authenticated within such a first window. For example, the first window of time may be set as ten minutes, and the routine 700 may proceed to the step 720 only if the first user's identity was authenticated within ten minutes of the data access request having been received at the step 702. In other embodiments, a determination may additionally or alternatively be made as to whether the identity of each indicated second user 110 has been authenticated within a second window of time following receipt of the request at the step 702, and the routine may proceed to the step 720 only if it is determined that each such second user's identity was authenticated within such a second window. For example, the second window of time may be set as one minute, and the routine 700 may proceed to the step 720 only if each second user's identity was authenticated within one minute of the data access request having been received at the step 702. In still other embodiments, a determination may additionally or alternatively be made as to whether the identities of the first and second users are authenticated in less than a threshold period of time (e.g., five minutes) of one another, and the routine may proceed to the step 720 only if it is determined that the first and second users' identities were authenticated within such a timeframe.

In some embodiments, the type of information collected from the first user 106 and the second user(s) 110 for authentication purposes may be the same. In other embodiments, the types of information collected from the first user 106 and the second user(s) 110 for authentication purposes may be different. Further, in some embodiments, the process of determining whether to authenticate, and taking steps to authenticate the identity of the first user 106, i.e., steps 704, 706, and 708 in FIG. 7, or the process of determining whether to authenticate, and taking steps to authenticate the identity of second user(s) 110, i.e., steps 710, 712, and 714 in FIG. 7, may be omitted, so that the identity of only one of the first user 106 and the second user(s) 110 may be conditionally confirmed in the manner described herein.

In some embodiments, the information collected from the first user 106 and/or the second user(s) 110 for authentication purposes may include a password that may be automatically generated or user-defined. In other embodiments, the information collected from the first user 106 and/or the second user(s) 110 for authentication purposes may additionally or alternatively include biometric information of the first user 106 and/or the second user(s) 110. Examples of biometric information that may be input by the first user 106 and/or the second user(s) 110 and compared (either by the data access control system 102 or by an authentication service) include, without limitation, a fingerprint applied to a fingerprint scanner, a facial image acquired by a camera, a voice sample acquired by a microphone, a retina image acquired by a retina scanner, and a brainwave signature acquire by a brainwave scanner. In some embodiments, an authentication service may interface with a device operated by a user (which may be the same as or separate from the first device 104 or the second device 108), e.g., a smartphone, to perform authentication so that biometric or other sensitive user information need not be transmitted over a network.

Suitable fingerprint scanners may, for example, be obtained from Bayometric of San Jose, California, Mantra Softech (India) Pvt. Ltd., or Crossmatch, of Palm Beach Gardens, Florida. Examples of suitable facial recognition systems are Face ID by Apple Inc. of Cupertino, California, and DeepFace by Facebook, Inc. of Menlo Park, California.

Still further, in some embodiments, the identity of the first user 106 and/or the second user(s) 110 may additionally or alternatively be authenticated by sending a confirmation request to a device or service known to be accessible by the first user 106 or a second user(s) 110 only upon proper authentication of the first or second user's identity. For example, in some implementations, a request for confirmation of the first or second user's identity may be sent to a proprietary mobile device or email account associated with the first user 106 or the second user 110. In such implementations, receipt of an affirmative confirmation from the associated device or service may be relied upon, at least in part, to authenticate the identity of the first user 106 or the second user 110.

Although the routine 700 shown in FIG. 7 illustrates the step 704 (i.e., determining whether the first user's identity is to be authenticated) being performed prior to the step 710 (i.e., determining whether one or more second users' identities are to be authenticated), it should be appreciated that the step 710 (and the steps 712 and 714, if applicable) may instead be performed prior to, or in parallel with, the step 704 (and the steps 706 and 708, if applicable) in other embodiments.

In some embodiments, the authentication processes invoked at the step 706 and/or step 712 may be adjusted dynamically based on information received by the data access control system 102 before or during such authentication processes. For example, several failed authentication attempts by the first user 106 and/or the second user 110 using a first authentication process may cause the system 102 to switch to a second, more reliable authentication process for one or more of the individuals, or may cause the system 102 to invoke an authentication process for an entirely new individual. For example, several failed attempts by the first user 106 to enter a correct password may cause the system 102 to require biometric (e.g., fingerprint) authentication by the first user 106 and/or one or more second users 110.

The step 720 illustrated in FIG. 7 may correspond to any of a number of possible actions that may be taken by the data access control system 102 in the event that the identity of the first user 106 and/or the second user(s) 110 have been properly authenticated, if so required. In embodiments in which the request of the step 702 corresponds to the access request 532 of the download token generation process shown in FIG. 5B, for example, the step 720 may correspond to causing the access management system 234 to send the prepare message 534 to the storage system 238 so that process may continue. In embodiments in which the request of the step 702 corresponds to the file download request 542 shown in FIG. 5B, on the other hand, the step 720 may, for example, correspond to causing the storage control server(s) 204*c* to perform the step 544 so the file transfer process can continue. In embodiments in which a file download request including a download token was initially directed from a client 202 to the access management server(s) 204*b*, or one or more other servers 204, for performance of the routine 700, the step 720 may involve generating and sending to the client 202 a download link (like the download link 540 shown in FIG. 5B) that can then be sent to the storage control server(s) 204*c* for transferring a file to the client 202. In yet other embodiments, the step 720 may involve simply causing an identified file (or other data) to be transferred from a repository to the first device 104.

In embodiments in which the request of the step 702 corresponds to a request by the first device 104 for on-line access to a file in a server-based storage system, the step 720 may correspond to causing a web server to provide such on line access to a web browser of the client device 104.

In embodiments in which the request of the step 702 corresponds to a request by a client 202 who is attempting to gain access to a computing environment, application, etc., from an application delivery system such as that described above in connection with FIGS. 2B and 4, the step 720 may, for example, correspond to allowing the requested access to proceed.

In still other embodiments, the step 720 may additionally or alternatively involve sending to the first device 104 a decryption key that the first device 104 can use to decrypt and access one or more files, applications, etc., that are already on or accessible by the first device 104, as discussed above. In such embodiments, an application on the first device 104, either independent of the file or other data, or embedded in an executable container with the file or other data as discussed above, may use the decryption key received from the data access control system 102 to decrypt the file or other data.

As shown in FIG. 7, in some embodiments, if the identity of the first user 106 or the second user 110 cannot be confirmed at the step 708 or step 714, then the data access control system 102 may, at step 716, abort the access approval process and thus deny access to the requested file(s) or other data by the first device 104. In addition, as also shown (see step 718), the data access control system 102, in some embodiments, may also log the authentication failure and may send a message to either or both of the first device 104 and the second device 108 to inform the first user 106 and/or the second user 110 of the access denial and/or the failure of the identity authentication process.

Figure 8:
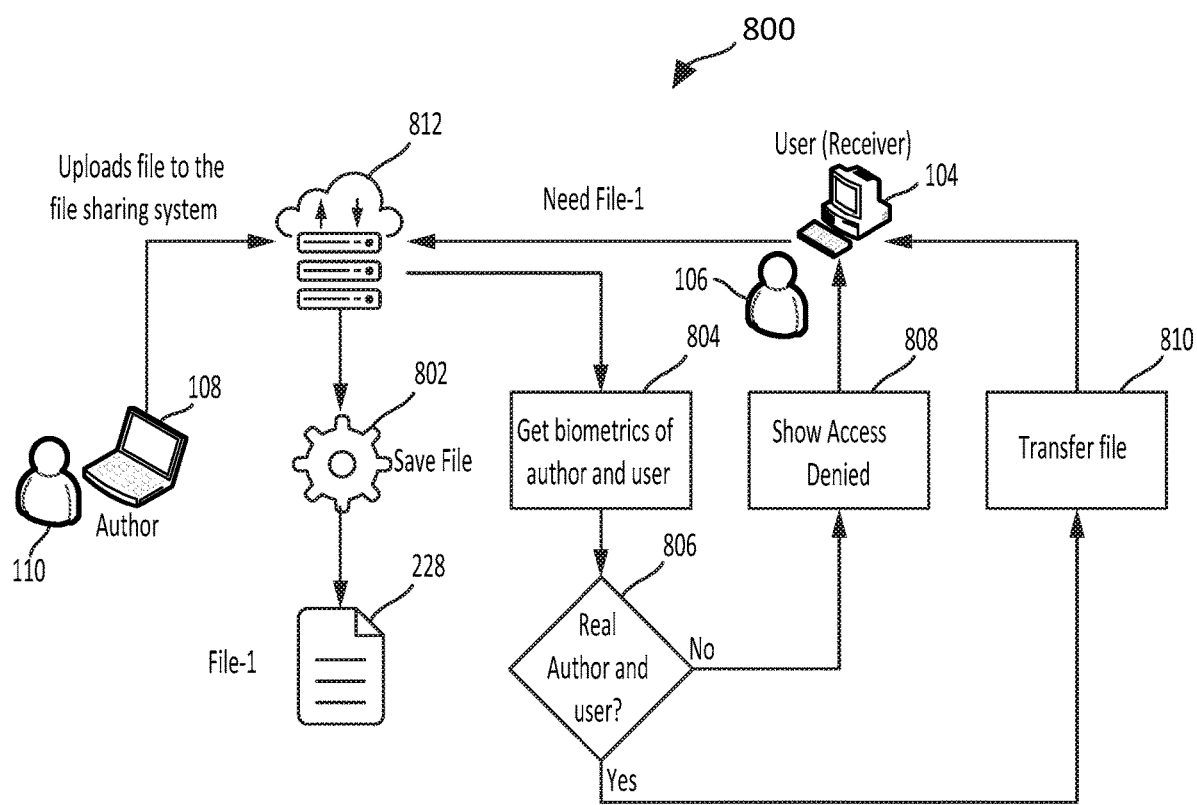
FIG. 8 is a flow chart illustrating an example of a process that may be performed by a file sharing system that includes a data access control system such as that shown in FIG. 1 in accordance with some embodiments.

FIG. 8 shows an example process 800 by which a first user 106 and a second user 110 may operate a first device 104 and a second device 108, respectively, to interact with a file sharing system 812, e.g., a cloud-based version of the file sharing system 230 configured to implement the routine 700, to upload and download a file 228 from a storage medium. As shown in FIG. 8, the second user 110, who is the author of the file in this example, may upload the file 228 from the second device 108 to the file sharing system 812 so as to cause the file 228 to be saved (step 802) to the storage medium. As noted above, in some embodiments, each time a file is uploaded to the file sharing system 812, the file may be encrypted using public and private keys, and access to the file may subsequently be enabled by sending a decryption key to a recipient of the file. In other embodiments, access to the file may additionally or alternatively be managed by controlling the circumstances under which the file can be transferred from storage to a recipient computing device.

As also shown, the first user 106 may send a message from the first device 104 to the file sharing system 812 communicating a request ("Need File-1") to receive the file 228. In response to receiving such message, the file sharing system 812 may obtain (step 804) biometric information (e.g., using fingerprint scanners) from the second user 110 (the author of the file) and the first user 106 (the person who wants access to the file), and determine (step 806) whether the first user 106 and the second user 110 are who they purport to be. If the identities of the first user 106 and the second user 110 are verified at the step 806, then the file 228 may be transferred (step 810) to the first device 104 operated by the first user 106 and/or a decryption key for the file may be sent from the file sharing system 812 to the first device 104. If, on the other hand, the identity of either the first user 106 or the second user 110 cannot be verified, then the first device 104 is denied (step 808) access to the file.

Figure 9:
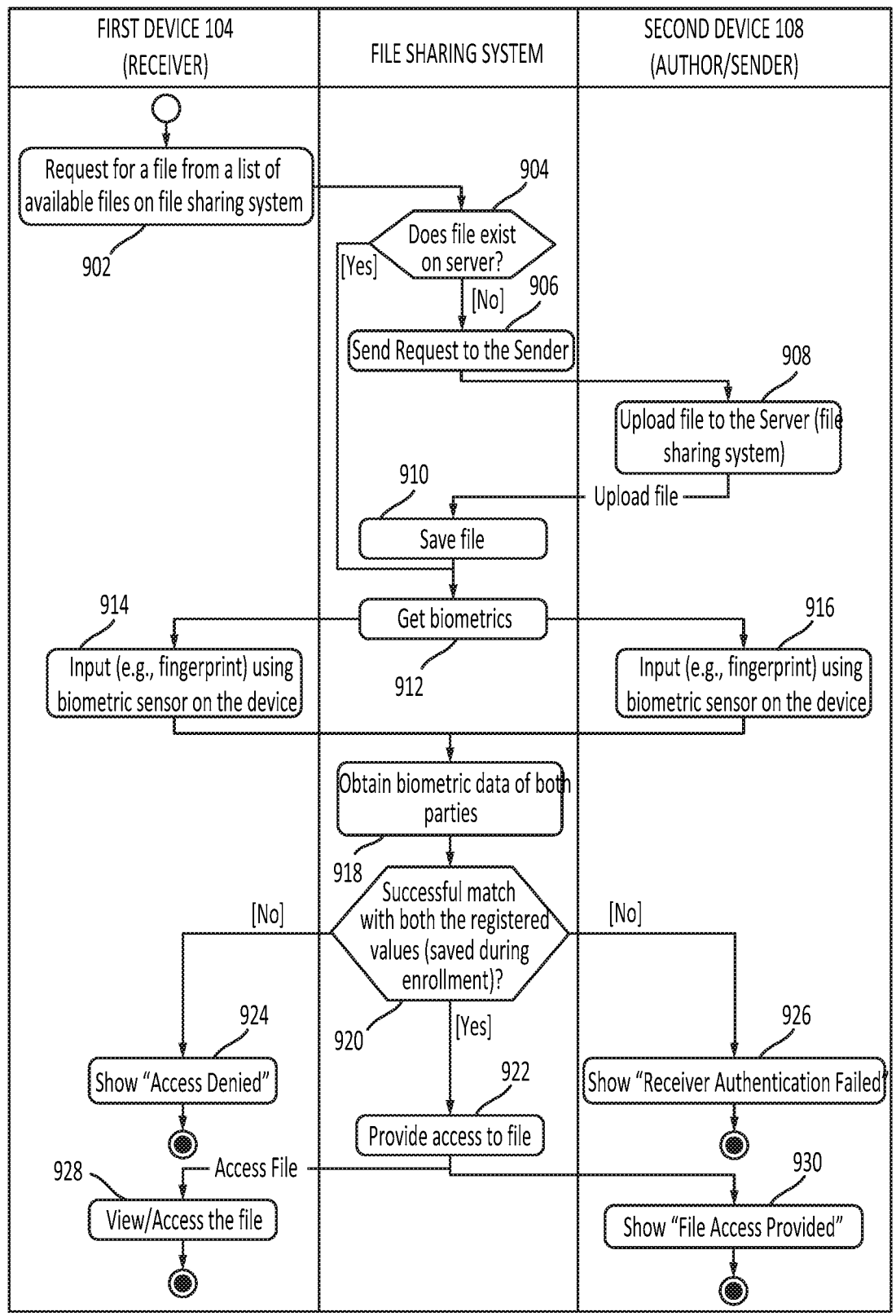
FIG. 9 is a flow chart illustrating another example of a process that may be performed by a file sharing system that includes a data access control system such as that shown in FIG. 1 in accordance with some embodiments.

FIG. 9 shows another example of how a first device 104 (operated by a person who wants access to a file) and a second device 108 (operated by an author and/or sender of the file) may interact with a file sharing system that is configured to implement the routine 700, such as the data access control system 102 disclosed herein, to upload and/or obtain access to a file. As shown, the first device 108 may request (step 902) access to a file that is identified on a list of files available on the file sharing system. The list of files may, for example, have been obtained after the first user has logged in to the file sharing system or may have been reflected in an email or other message sent to the first device 108. If it is determined (step 904) that the requested file has not already been uploaded to the system, then a notification of the request for the file may be sent (step 906) to the second device 108, and the second device may upload (step 908) the file for storage (step 910) by the system. As noted above, in some embodiments, the file may be encrypted using public and private encryption keys when the file is so uploaded.

In the illustrated example, once the requested file is present on file sharing system, a process may be invoked (step 912) to obtain biometric information (e.g., a fingerprint) from the first user 106 of the first device 104 (step 914) and from the second user 110 of the second device 108 (step 916). Once the biometric information of the first and second users has been obtained (step 918), a determination may be made (step 920) whether the obtained biometric information matches stored biometric information for both of the first user 106 and the second user 110. If the obtained biometric information matches the stored biometric information for both users, then the first device 104 may be provided access (steps 922 and 928) to the requested file, and a message may be sent to the second device 108 informing (step 930) the second user 108 that such access has been provided. If, on the other hand, the obtained biometric information does not match (step 920) the stored biometric information for either the first user 106 or the second user 110, then messages may be sent (steps 924 and 926) to the first and second devices informing the user(s) of the failed file access attempt.

H. Example Implementations of Methods, Systems, and Computer-Readable Media in Accordance with the Present Disclosure The following paragraphs (M1) through (M11) describe examples of methods implemented in accordance with the present disclosure.

(M1) A computing system may receive a first request for access to data by a first device operated by a first user, and determine that an identity of a second user associated with the data is to be authenticated to allow access to the data by the first device. The computing system may further invoke a first authentication process to authenticate the identity of the second user based on a first input provided to a second device by the second user, determine that the identity of the second user has been authenticated based on the first input, and provide access to the data by the first device based at least in part on authentication of the identity of the second user.

(M2) A computing system may perform a method as described in paragraph (M1), wherein the first authentication process causes the second device to output a prompt for the first input to authenticate the identity of the second user.

(M3) A computing system may perform a method as described in paragraph (M2), wherein the prompt requests that the second user provide a biometric input to the second device.

(M4) A computing system may perform a method as described in paragraph (M2) or paragraph (M3), wherein invoking the first authentication process further comprises sending an authentication request to an authentication service such that the authentication service causes the second device to output the prompt, and determining that the identity of the second user has been authenticated is based at least in part on receipt of a response from the authentication service that indicates the identity of the second user has been authenticated.

(M5) A computing system may perform a method as described in any of paragraphs (M1) through (M4), wherein the first authentication process authenticates the identity of the second user based on a biometric input provided to the second device by the second user.

(M6) A computing system may perform a method as described in any of paragraphs (M1) through (M5), and may further determine that an identity of the first user associated with the data is to be authenticated to allow access to the data by the first device, invoke a second authentication process for authenticating the identity of the first user based on a second input provided to the first device by the first user, determine that the identity of the first user has been authenticated based on the second input, and provide access to the data by the first device based at least in part on authentication of the identity of the first user.

(M7) A computing system may perform a method as described in paragraph (M6), wherein the second authentication process authenticates the identity of the first user based at least in part on a first biometric input provided to the first device by the first user, and the first authentication process authenticates the identity of the second user based at least in part on a second biometric input provided to the second device by the second user.

(M8) A computing system may perform a method as described in any of paragraphs (M1) through (M7), and may further receive from the second device biometric information that is used to authenticate the identity of the second user.

(M9) A computing system may perform a method as described in any of paragraphs (M1) through (M8), and may further send a notification of the first request to the second device, receive the data after sending the notification, and store the data.

(M10) A computing system may perform a method as described in any of paragraphs (M1) through (M9), and may further determine that the identity of the second user has been authenticated within a window of time following receipt of the first request, and provide access to the data by the first device based at least in part on the identity of the second user having been authenticated within the window of time.

(M11) A computing system may perform a method as described in any of paragraphs (M1) through (M10), wherein the data is encrypted, and the computing system provides access to the data by the first device by sending a decryption key for decrypting the data to the first device.

The following paragraphs (S1) through (S8) describe examples of systems implemented in accordance with the present disclosure.

(S1) A system may comprise a memory and at least one processor coupled to the memory. The at least one processor may be configured to receive a first request for access to data by a first device operated by a first user, to determine that an identity of a second user associated with the data is to be authenticated to allow access to the data by the first device, to invoke a first authentication process to authenticate the identity of the second user based on a first input provided to a second device by the second user, to determine that the identity of the second user has been authenticated based on the first input, and to provide access to the data by the first device based at least in part on authentication of the identity of the second user.

(S2) A system may be configured as described in paragraph (S1), and the at least one processor may be further configured to invoke the first authentication process at least in part by sending an authentication request to an authentication service such that the authentication service causes the second device to output a prompt for the first input to authenticate the identity of the second user, and to determine that the identity of the second user has been authenticated at least in part by determining that a response received from the authentication service indicates the identity of the second user has been authenticated.

(S3) A system may be configured as described in paragraph (S1) or paragraph (S2), and the first authentication process may authenticate the identity of the second user based on a biometric input provided to the second device by the second user.

(S4) A system may be configured as described in any of paragraphs (S1) through (S3), and the at least one processor may be further configured to determine that an identity of the first user associated with the data is to be authenticated to allow access to the data by the first device, to invoke a second authentication process for authenticating the identity of the first user based on a second input provided to the first device by the first user, to determine that the identity of the first user has been authenticated based on the second input, and to provide the access to the data by the first device based at least in part on authentication of the identity of the first user.

(S5) A system may be configured as described in any of paragraphs (S1) through (S4), and the at least one processor may be further configured to receive biometric information from the second device, and to use the biometric information to authenticate the identity of the second user.

(S6) A system may be configured as described in any of paragraphs (S1) through (S5), and the at least one processor may be further configured to send a notification of the first request to the second device, to receive the data after sending the notification, and to store the data.

(S7) A system may be configured as described in any of paragraphs (S1) through (S6), and the at least one processor may be further configured to determine that the identity of the second user has been authenticated within a window of time following receipt of the first request, and to provide access to the data by the first device based at least in part on the identity of the second user having been authenticated within the window of time.

(S8) A system may be configured as described in any of paragraphs (S1) through (S7), and the at least one processor may be further configured to provide access to the data by the first device at least in part by sending a decryption key for decrypting the data to the first device.

The following paragraphs (CRM1) through (CRM8) describe examples of computer-readable media implemented in accordance with the present disclosure.

(CMR1) At least one computer-readable medium may be encoded with instructions which, when executed by at least one processor, cause the at least one processor to receive a first request for access to data by a first device operated by a first user, to determine that an identity of a second user associated with the data is to be authenticated to allow access to the data by the first device, to invoke an authentication process to authenticate the identity of the second user based on a first input provided to a second device by the second user, to determine that the identity of the second user has been authenticated based on the first input, and to provide access to the data by the first device based at least in part on authentication of the identity of the second user.

(CRM2) At least one computer-readable medium may be encoded with instructions as described in paragraph (CRM1), and may be further encoded with additional instructions which, when executed by the at least one processor, further cause the at least one processor to invoke the first authentication process at least in part by sending an authentication request to an authentication service such that the authentication service causes the second device to output a prompt for the first input to authenticate the identity of the second user, and to determine that the identity of the second user has been authenticated at least in part by determining that a response received from the authentication service indicates the identity of the second user has been authenticated.

(CRM3) At least one computer-readable medium may be encoded with instructions as described in paragraph (CRM1) or paragraph (CRM2), and the first authentication process may authenticate the identity of the second user based on a biometric input provided to the second device by the second user.

(CRM4) At least one computer-readable medium may be encoded with instructions as described in any of paragraphs (CRM1) through (CRM3), and may be further encoded with additional instructions which, when executed by the at least one processor, further cause the at least one processor to determine that an identity of the first user associated with the data is to be authenticated to allow access to the data by the first device, to invoke a second authentication process for authenticating the identity of the first user based on a second input provided to the first device by the first user, to determine that the identity of the first user has been authenticated based on the second input, and to provide the access to the data by the first device based at least in part on authentication of the identity of the first user.

(CRM5) At least one computer-readable medium may be encoded with instructions as described in any of paragraphs (CRM1) through (CRM4), and may be further encoded with additional instructions which, when executed by the at least one processor, further cause the at least one processor to receive biometric information from the second device, and to use the biometric information to authenticate the identity of the second user.

(CRM6) At least one computer-readable medium may be encoded with instructions as described in any of paragraphs (CRM1) through (CRM5), and may be further encoded with additional instructions which, when executed by the at least one processor, further cause the at least one processor to send a notification of the first request to the second device, to receive the data after sending the notification, and to store the data.

(CRM7) At least one computer-readable medium may be encoded with instructions as described in any of paragraphs (CRM1) through (CRM6), and may be further encoded with additional instructions which, when executed by the at least one processor, further cause the at least one processor to determine that the identity of the second user has been authenticated within a window of time following receipt of the first request, and to provide access to the data by the first device based at least in part on the identity of the second user having been authenticated within the window of time.

(CRM8) At least one computer-readable medium may be encoded with instructions as described in any of paragraphs (CRM1) through (CRM7), and may be further encoded with additional instructions which, when executed by the at least one processor, further cause the at least one processor to provide access to the data by the first device at least in part by sending a decryption key for decrypting the data to the first device.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   receiving, by a file sharing system and from a first remote device operated by a first user, a token that identifies a file stored by the file sharing system and is configured to enable downloading of the file from the file sharing system;
   in response to receiving the token, invoking, by the file sharing system, a first authentication process to authenticate an identity of a second user based on a first input provided by the second user;
   determining, by the file sharing system, that the identity of the second user has been authenticated based on the first input a; and
   downloading, by the file sharing system, the file to the first remote device based at least in part on the token and authentication of the identity of the second user.

2. The method of claim 1, further comprising:
   in response to receiving the token, invoking, by the file sharing system, a second authentication method to authenticate an identity of the first user of the first remote device based on a second input provided by the first user; and
   determining, by the file sharing system, that the identity of the first user has been authenticated based on the second input;
   wherein providing access to the file by the first remote device is further based at least in part on authentication of the identity of the first user.

3. The method of claim 2, wherein:
   determining that the identity of the first user has been authenticated comprises determining that the identity of the first user has been authenticated based at least in part on a biometric input provided to the first remote device by the first user.

4. The method of claim 1, wherein the first authentication process causes a second remote device operated by the second user to output a first prompt requesting that the second user provide the first input to the second remote device.

5. The method of claim 4, wherein the first prompt requests that the second user provide a biometric input to the second remote device.

6. The method of claim 1, further comprising:
   receiving, by the file sharing system, a request to make the file accessible; and
   in response to the request, generating, by the file sharing system, the token.

7. The method of claim 6, wherein the request is received from a second remote device operated by the second user.

8. The method of claim 7, further comprising:
   receiving, at the file sharing system and from the second remote device, the file; and
   storing, by the file sharing system, the file.

9. The method of claim 7, further comprising:
   authenticating, by the file sharing system, the identity of the second user based on a second input provided by the second user to the second remote device;
   wherein generating the token is based at least in part on the identity of the second user having been authenticated based on the second input.

10. The method of claim 1, wherein:
    the file is encrypted; and
    providing access to the file by the first remote device further comprises sending, by the file sharing system to the first remote device, a decryption key for decrypting the file.

11. The method of claim 1, further comprising:
    receiving, by the file sharing system and from a second remote device, biometric information that is used to authenticate the identity of the second user.

12. The method of claim 1, wherein determining that the identity of the second user has been authenticated comprises determining that the identity of the second user has been authenticated based at least in part on a biometric input provided to a second remote device by the second user.

13. The method of claim 1, wherein:
    invoking the first authentication process comprises sending an authentication request to an authentication service such that the authentication service authenticates the identity of the second user based on the first input; and
    determining that the identity of the second user has been authenticated is based at least in part on receipt of a response from the authentication service that indicates the identity of the second user has been authenticated.

14. The method of claim 1, further comprising:
    determining, by the file sharing system, that the identity of the second user has been authenticated within a first window of time following receipt of the token;
    wherein providing access to the file by the first remote device is further based at least in part on the identity of the second user having been authenticated within the first window of time.

15. The method of claim 14, further comprising:
    determining, by the file sharing system, that the identity of the first user has been authenticated within a second window of time following receipt of the token;
    wherein providing access to the file by the first remote device is further based at least in part on the identity of the first user having been authenticated within the second window of time.

16. A file sharing system, comprising:
    at least one processor; and
    at least one computer-readable medium encoded with instructions which, when executed by the at least one processor, cause the file sharing system to:
    receive, from a first remote device operated by a first user, a token that identifies a file stored by the file sharing system and is configured to enable downloading of the file from the file sharing system,
    in response to receiving the token, invoking a first authentication process to authenticate an identity of a second user based on a first input provided by the second user, determine that the identity of the second user has been authenticated based on the first input, and
    download the file to the first remote device based at least in part on the token and authentication of the identity of the second user.

17. The file sharing system of claim 16, wherein the at least one computer-readable medium is further encoded with additional instructions which, when executed by the at least one processor, further cause the file sharing system to:
    invoke the first authentication process at least in part by sending an authentication request to an authentication service such that the authentication service authenticates the identity of the second user based on the first input; and
    determine that the identity of the second user has been authenticated at least in part by determining that a response received from the authentication service indicates the identity of the second user has been authenticated.

18. The file sharing system of claim 16, wherein the at least one computer-readable medium is further encoded with additional instructions which, when executed by the at least one processor, further cause the file sharing system to:
   determine that the identity of the second user has been authenticated based at least in part on a biometric input provided to a second remote device by the second user.

19. The file sharing system of claim 16, wherein the at least one computer-readable medium is further encoded with additional instructions which, when executed by the at least one processor, further cause the file sharing system to:
   receive, from a second remote device, biometric information; and
   use the biometric information to authenticate the identity of the second user.

20. The file sharing system of claim 16, wherein the at least one computer-readable medium is further encoded with additional instructions which, when executed by the at least one processor, further cause the file sharing system to:
   determine that the identity of the second user has been authenticated within a window of time following receipt of the token; and
   provide access to the file by the first remote device based at least in part on the identity of the second user having been authenticated within the window of time.

21. The file sharing system of claim 16, wherein the at least one computer-readable medium is further encoded with additional instruction which, when executed by the at least one processor, further cause the file sharing system to:
   provide access to the file by the first remote device at least in part by sending, to the first remote device, a decryption key for decrypting the file.

22. The file sharing system of claim 16, wherein the at least one computer-readable medium is further encoded with additional instructions which, when executed by the at least one processor, further cause the file sharing system to:
   receive a request to make the file accessible; and
   generate the token in response to the request.

23. The file sharing system of claim 22, wherein the at least one computer-readable medium is further encoded with additional instructions which, when executed by the at least one processor, further cause the file sharing system to receive the request from a second remote device operated by the second user.

24. The file sharing system of claim 23, wherein the at least one computer-readable medium is further encoded with additional instructions which, when executed by the at least one processor, further cause the file sharing system to:
   receive the file from the second remote device; and store the file.

25. The file sharing system of claim 23, wherein the at least one computer-readable medium is further encoded with additional instructions which, when executed by the at least one processor, further cause the file sharing system to:
   authenticate the identity of the second user based on a second input provided by the second user to the second remote device; and
   generate the token based at least in part on the identity of the second user having been authenticated based on the second input.

26. The file sharing system of claim 16, wherein the at least one computer-readable medium is further encoded with additional instructions which, when executed by the at least one processor, further cause the file sharing system to:
   invoke the first authentication process so as to cause a second remote device operated by the second user to output a first prompt requesting that the second user provide the first input to the second remote device.

27. The file sharing system of claim 16, wherein the at least one computer-readable medium is further encoded with additional instructions which, when executed by the at least one processor, further cause the file sharing system to:
   in response to receiving the token, invoke a second authentication method to authenticate an identity of the first user of the first remote device based on a second input provided by the first user;
   determine that the identity of the first user has been authenticated based on the second input; and
   provide access to the file by the first remote device further based at least in part on authentication of the identity of the first user.

28. The file sharing system of claim 27, wherein the at least one computer-readable medium is further encoded with additional instructions which, when executed by the at least one processor, further cause the file sharing system to:
   determine that the identity of the first user has been authenticated based at least in part on a biometric input provided to the first remote device by the first user.

29. At least one non-transitory computer-readable medium encoded with instructions which, when executed by at least one processor of a file sharing system, cause the file sharing system to:
   receive, from a first remote device operated by a first user, a token that identifies a file stored by the file sharing system and is configured to enable downloading of the file from the file sharing system;
   in response to receiving the token, invoke a first authentication process to authenticate an identity of a second user based on a first input provided by the second user;
   determine that the identity of the second user has been authenticated based on the first input; and
   download the file to the first remote device based at least in part on the token and authentication of the identity of the second user.

30. The at least one non-transitory computer-readable medium of claim 29, further encoded with additional instructions which, when executed by the at least one processor, further cause the file sharing system to:
   receive a request to make the file accessible; and
   generate the token in response to the request.

* * * * *